Figure 1:
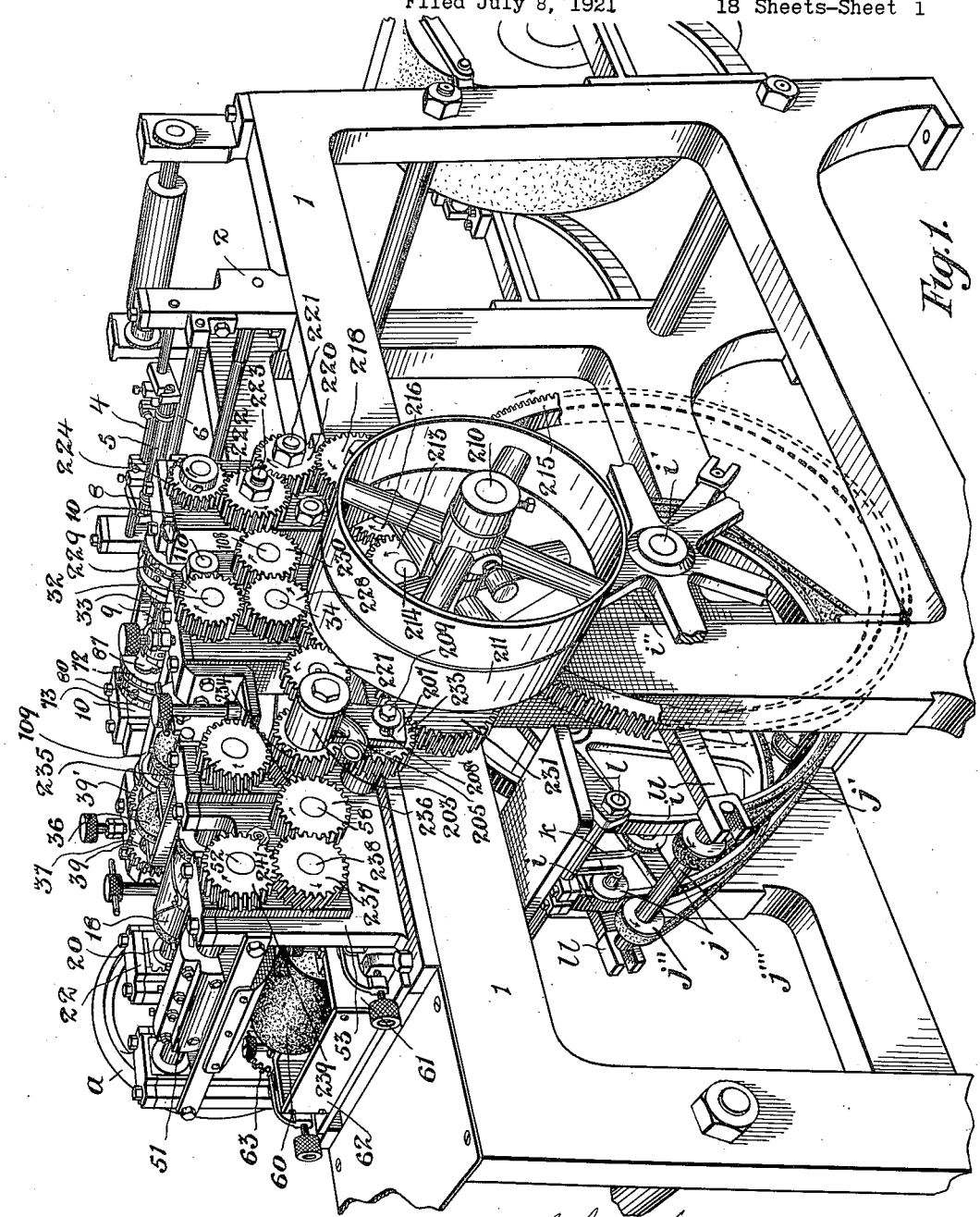

Dec. 16, 1924.

A. CHEETHAM

MACHINE FOR MAKING ENVELOPES

Filed July 8, 1921  18 Sheets-Sheet 1

1,519,439

INVENTOR.

BY

ATTORNEY.

Dec. 16, 1924.

A. CHEETHAM 1,519,439

MACHINE FOR MAKING ENVELOPES

Filed July 8, 1921   18 Sheets-Sheet 2

INVENTOR.
BY
ATTORNEY.

Dec. 16, 1924.  
A. CHEETHAM  
1,519,439  
MACHINE FOR MAKING ENVELOPES  
Filed July 8, 1921 18 Sheets-Sheet 3
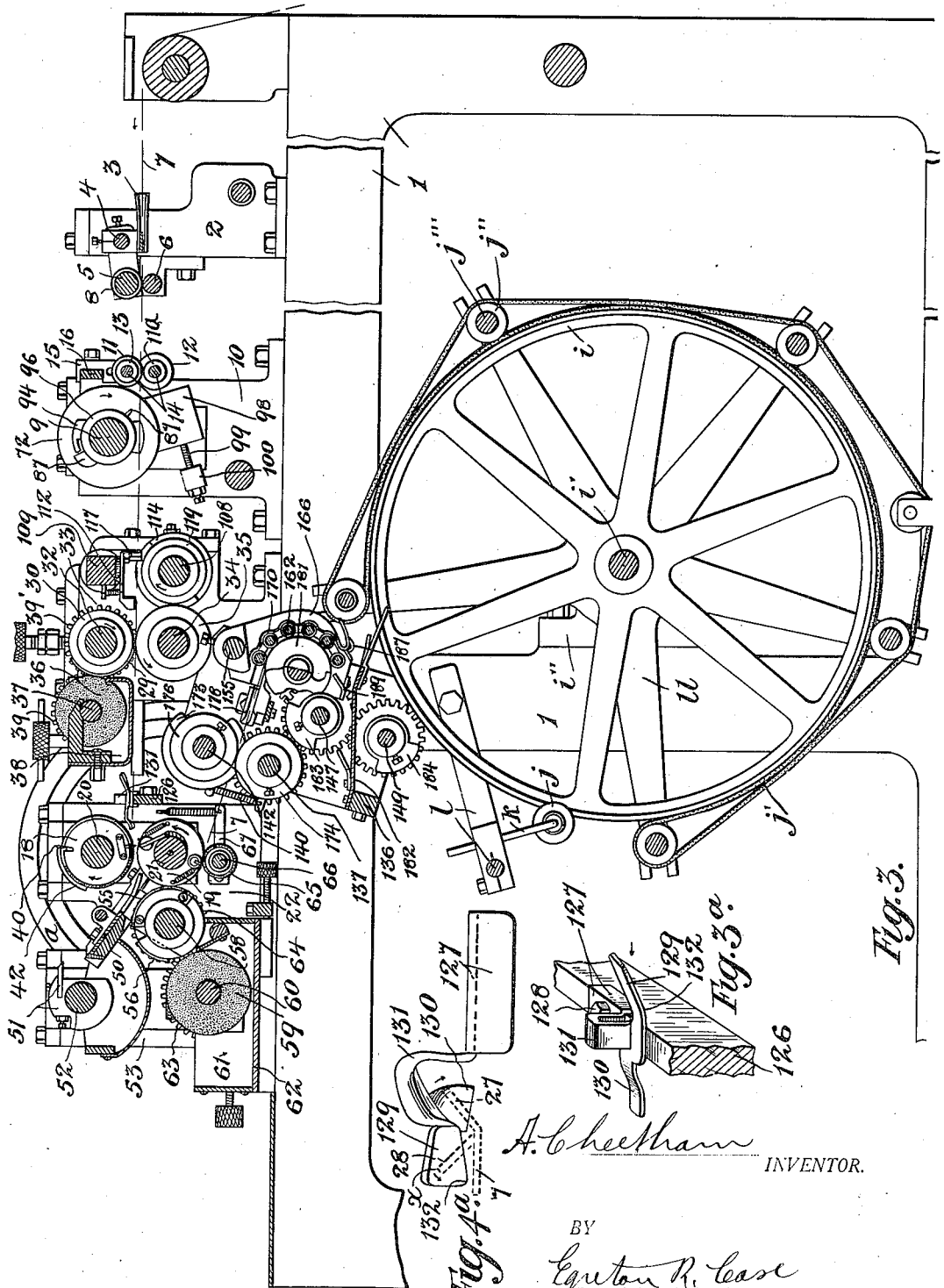
INVENTOR.  
BY  
ATTORNEY.

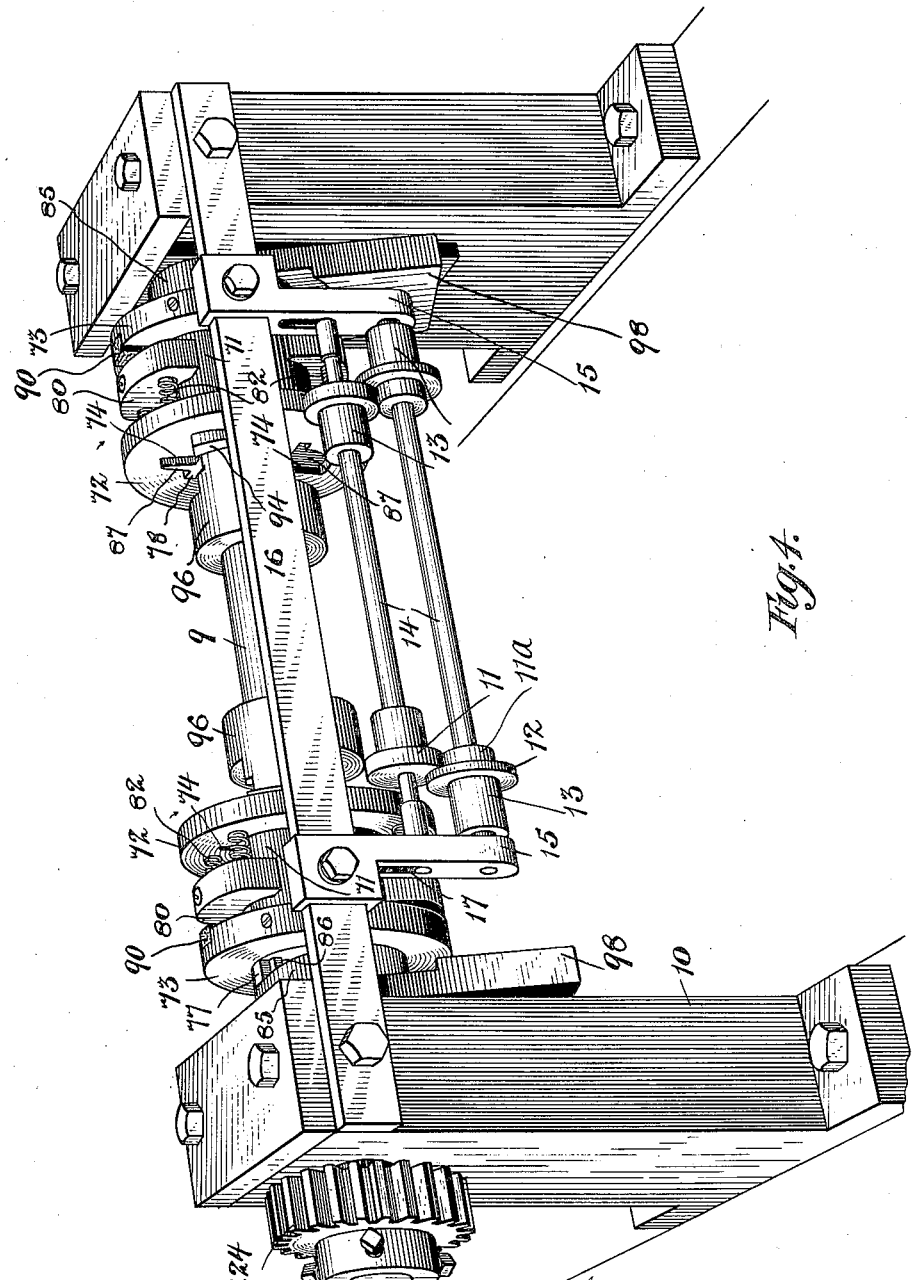

Dec. 16, 1924.
A. CHEETHAM
1,519,439
MACHINE FOR MAKING ENVELOPES
Filed July 8, 1921    18 Sheets-Sheet 5
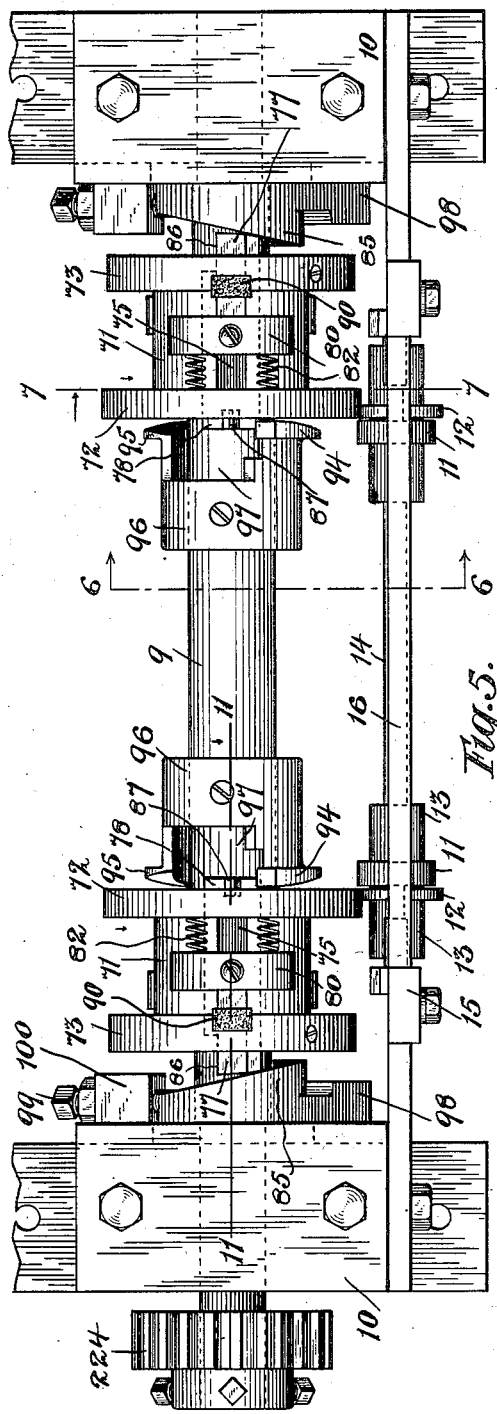
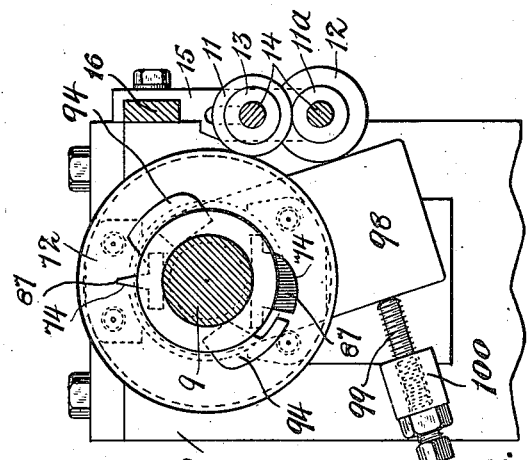
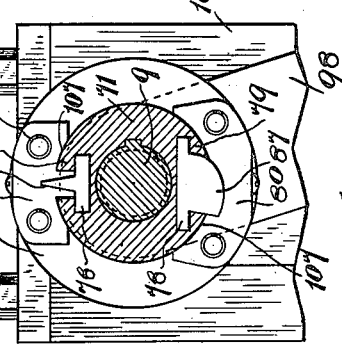
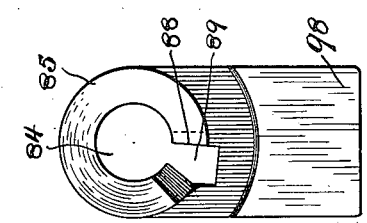
A. Cheetham
INVENTOR.
BY
Egerton R. Case
ATTORNEY.

Dec. 16, 1924.
A. CHEETHAM
1,519,439
MACHINE FOR MAKING ENVELOPES
Filed July 8, 1921    18 Sheets-Sheet 6
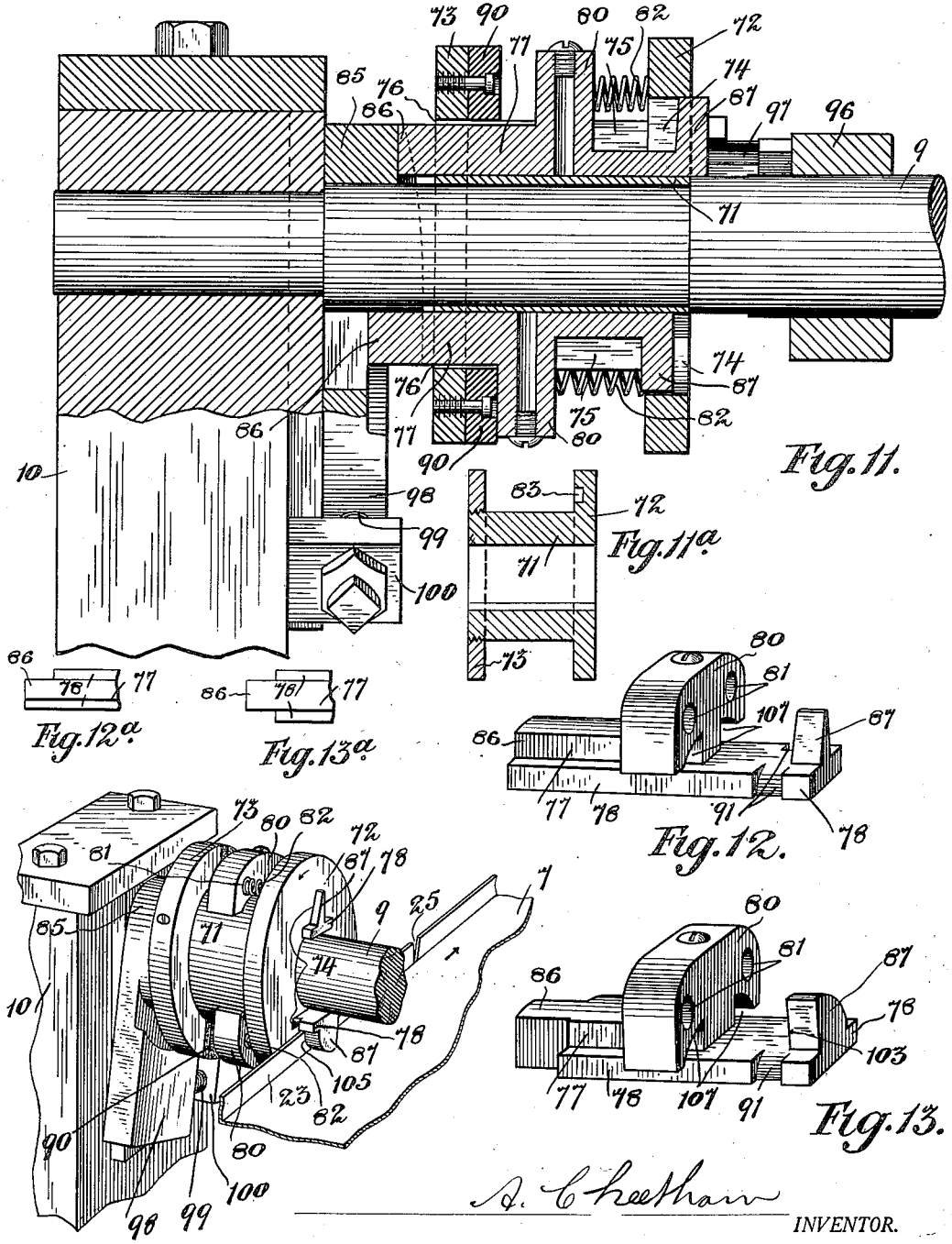

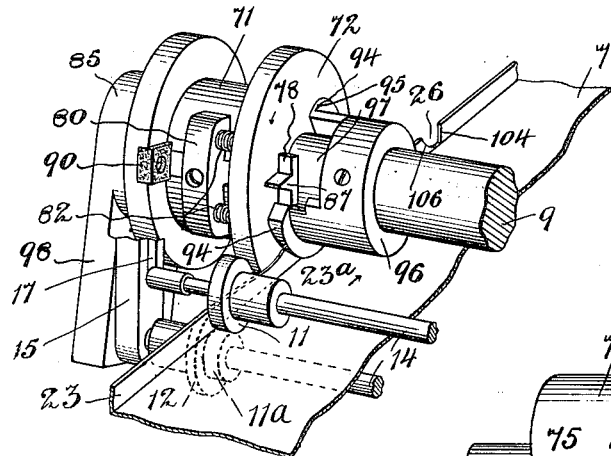
Fig.14.
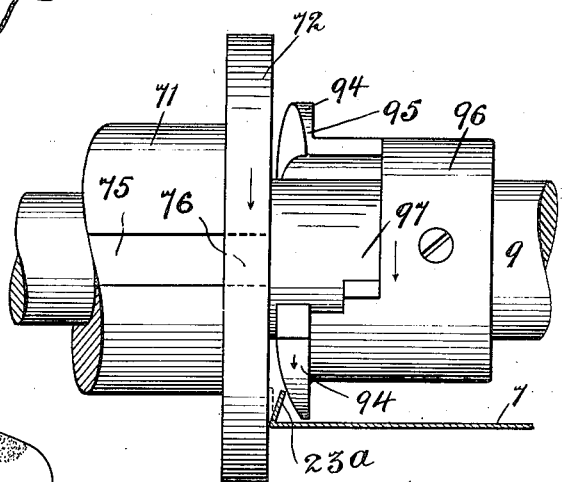
Fig.15.
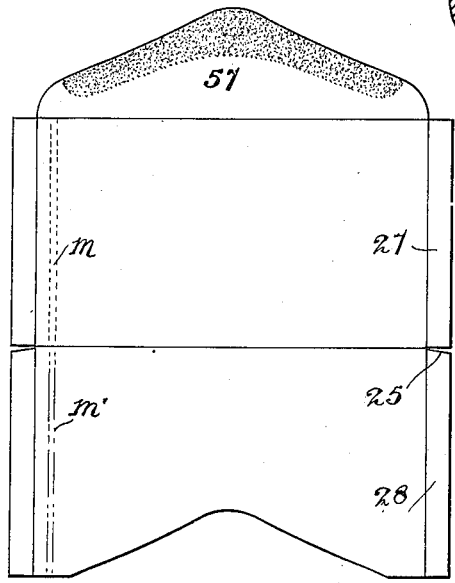
Fig.35.
Fig.36.

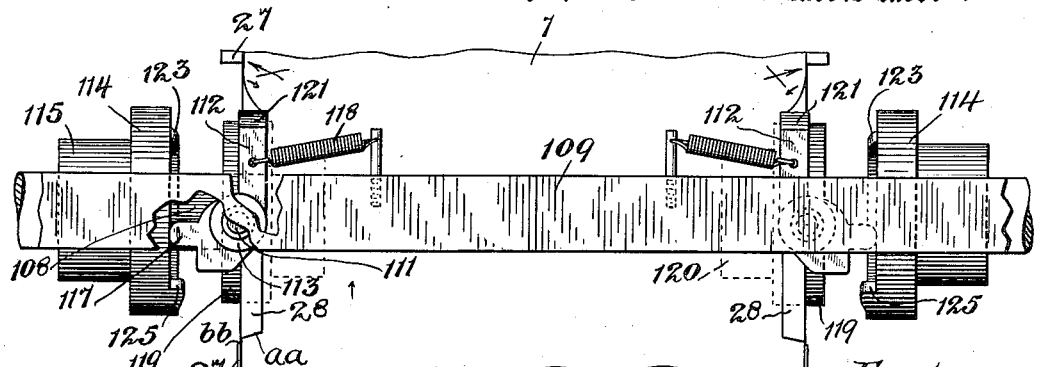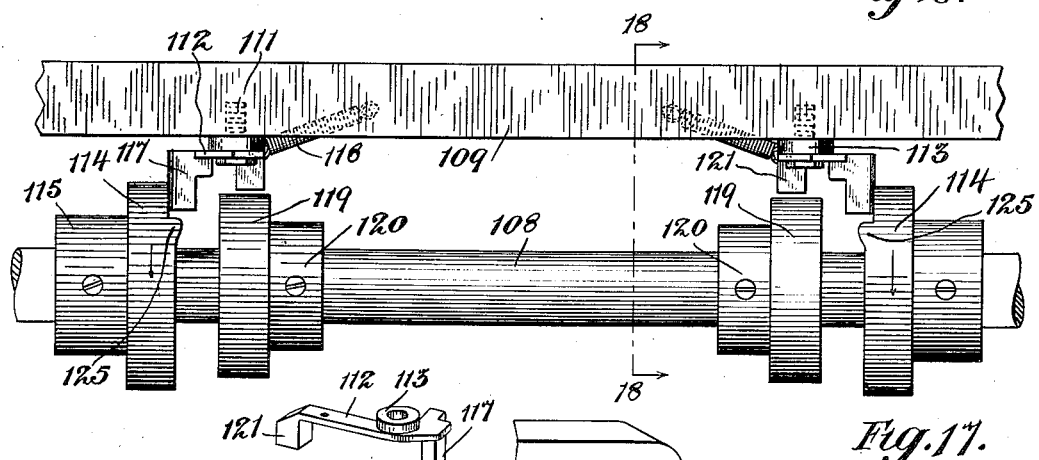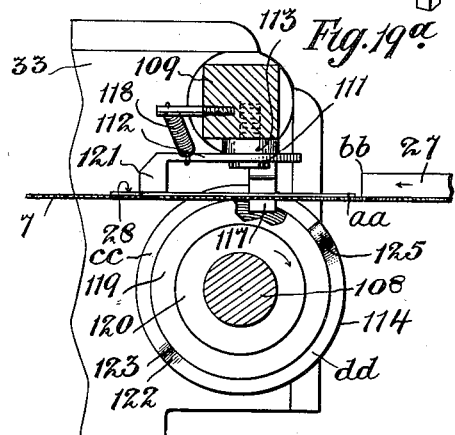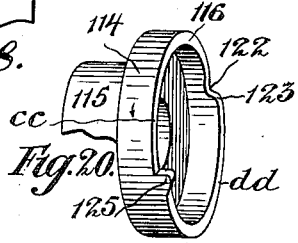

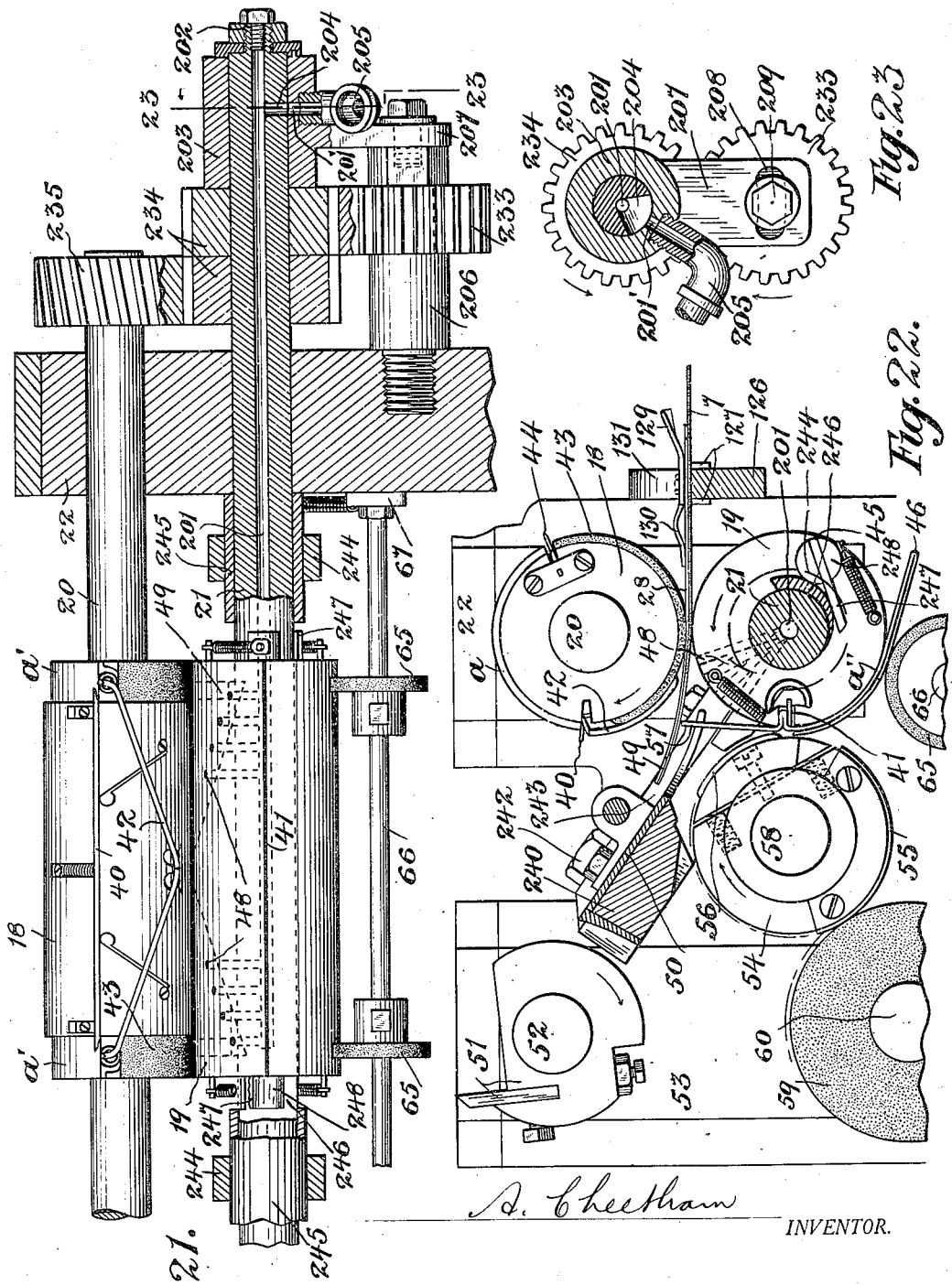

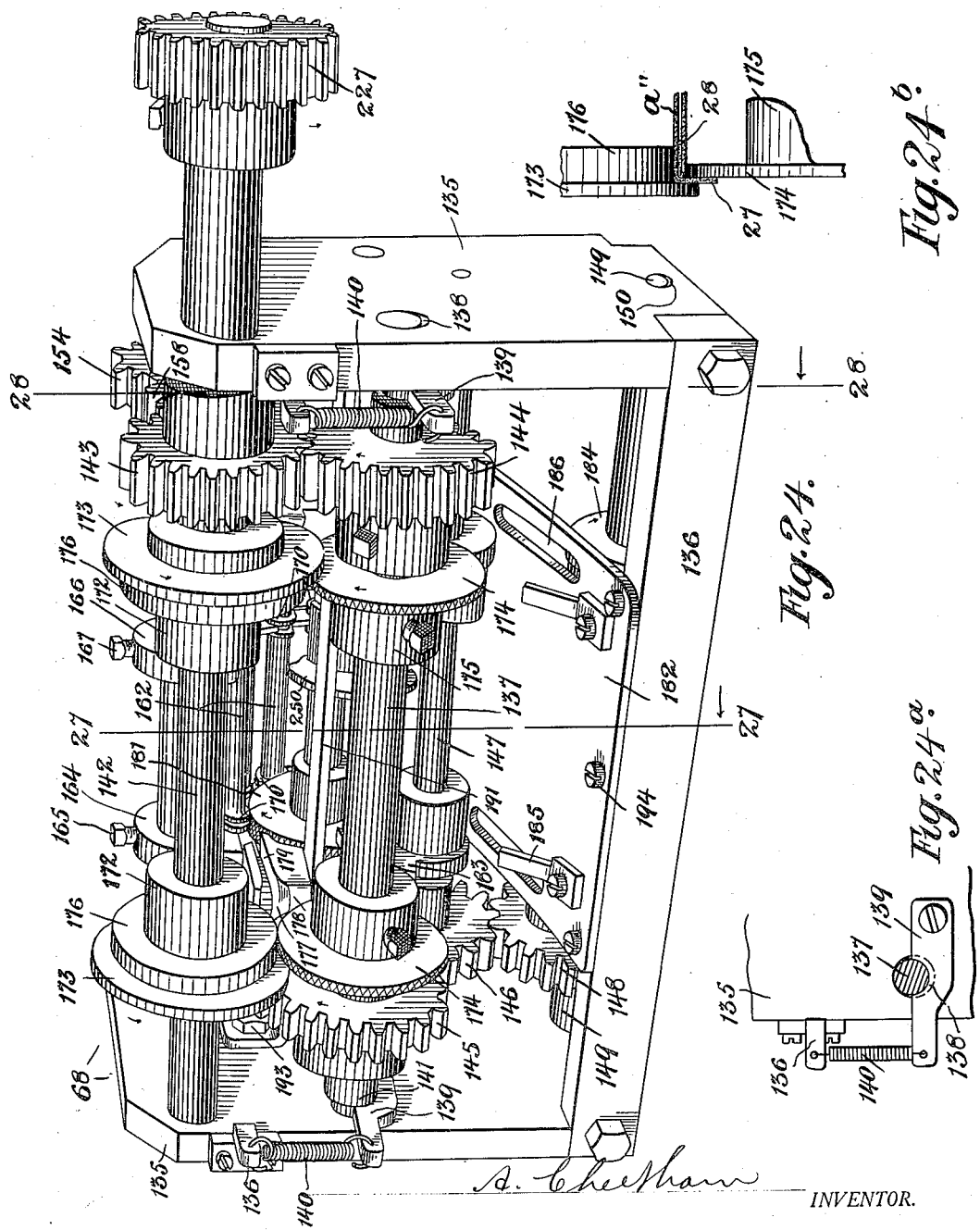

Dec. 16, 1924. 1,519,439
A. CHEETHAM
MACHINE FOR MAKING ENVELOPES
Filed July 8, 1921  18 Sheets-Sheet 11

A. Cheetham INVENTOR.
BY
_____ ATTORNEY.

Dec. 16, 1924.

A. CHEETHAM 1,519,439

MACHINE FOR MAKING ENVELOPES

Filed July 8, 1921   18 Sheets-Sheet 13

INVENTOR.
BY
ATTORNEY.

Dec. 16, 1924.　　　　　　　　　　　　　　　　1,519,439
A. CHEETHAM
MACHINE FOR MAKING ENVELOPES
Filed July 8, 1921　　　　18 Sheets-Sheet 14

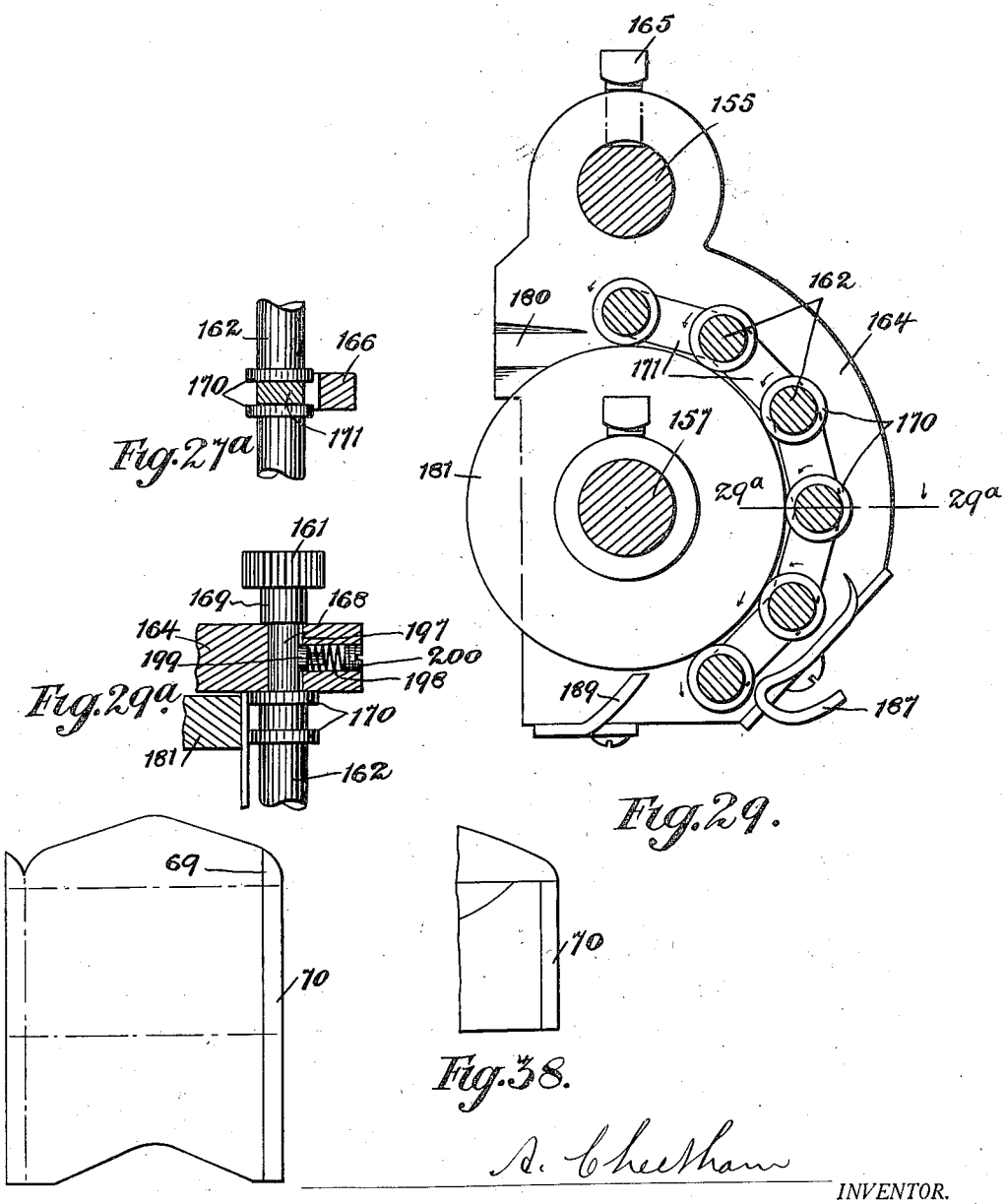

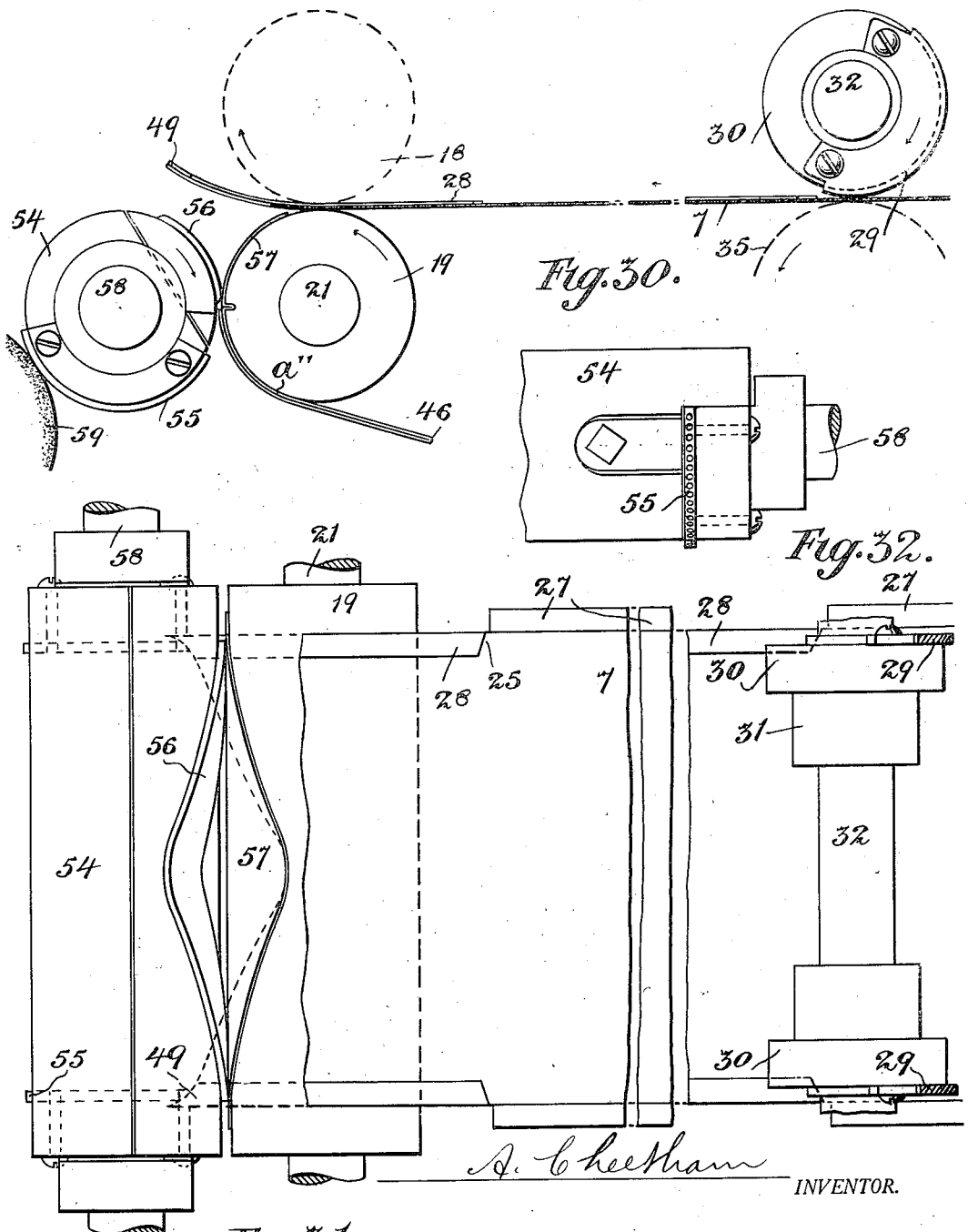

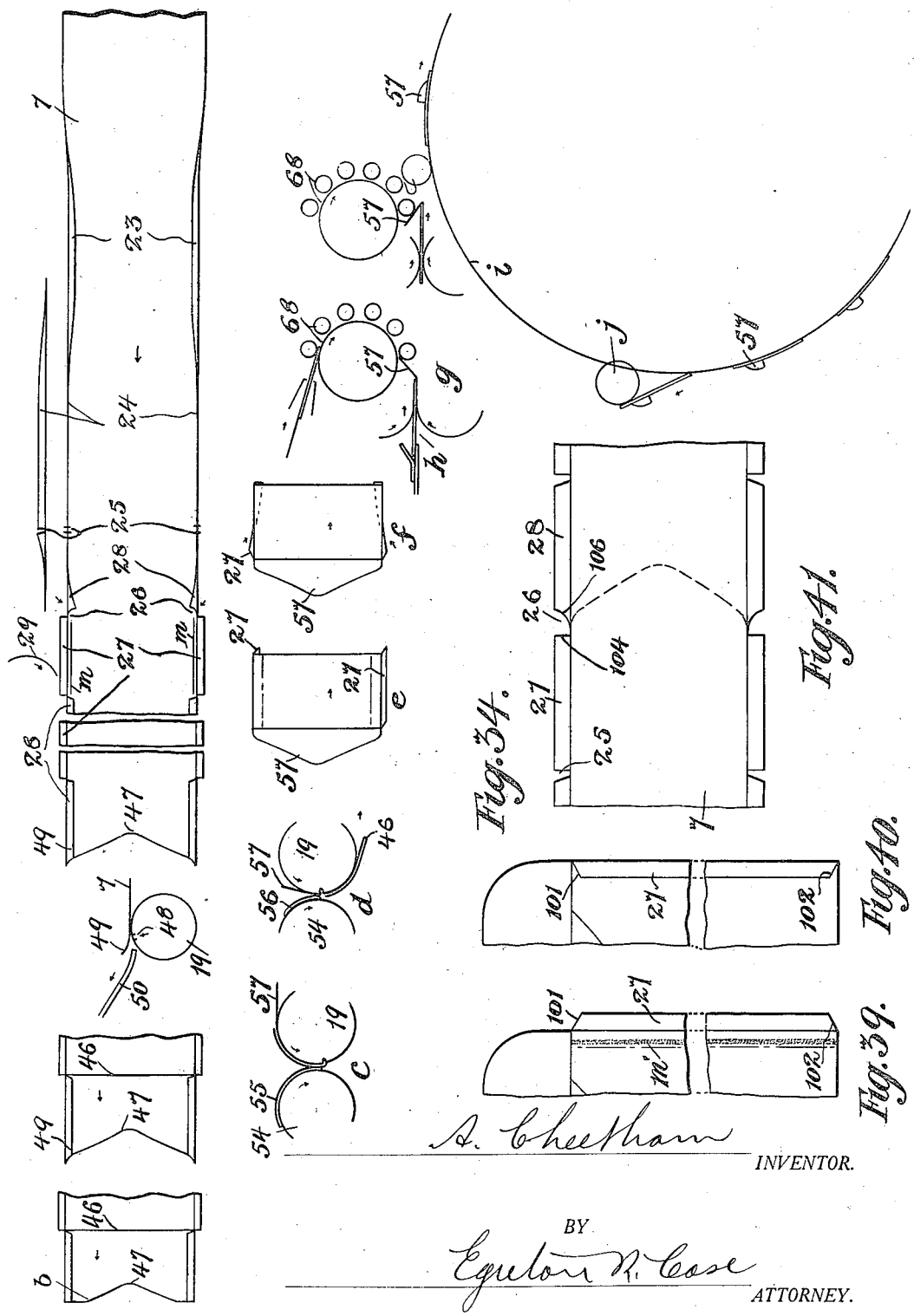

Patented Dec. 16, 1924.

1,519,439

UNITED STATES PATENT OFFICE.

ARTHUR CHEETHAM, OF TORONTO, ONTARIO, CANADA.

MACHINE FOR MAKING ENVELOPES.

Application filed July 8, 1921. Serial No. 483,273.

*To all whom it may concern:*

Be it known that I, ARTHUR CHEETHAM, a subject of the King of Great Britain, residing in the city of Toronto, county of York, Province of Ontario, Canada, have invented certain new and useful Improvements in Machines for Making Envelopes, of which the following is a specification.

My invention relates to improvements in machines for making envelopes, and relates more particularly to machines of this character used in manufacturing what are known as side-seam envelopes, from a continuously moving web, and the objects of my invention are:

1. To produce a machine of the class set forth in which the movements of the principal moving parts are of a rotary character, thereby enabling me to produce an automatic machine possessing the great advantages of rapidity and certainty in operation so as to provide for an increase in production of first-class envelopes at a low cost, completely gummed and individually completely folded as they pass from the machine, ready to be tied in packages and packed.

2. To provide a machine which can be adapted to manufacture various types of side-seam envelopes, and adjustable so that the width of the flaps forming said side-seams may be wider at one end of the envelope than at the other, if desired.

3. To sever, cut, or notch, the sides of the web of paper as it passes through the machine without tearing or otherwise injuring it, so that an improved type of double-side seam envelope may be produced which I term overlapped double-side-seam envelope, so that an envelope of the greatest security may be provided, and one possessing much strength at the overlapped side-seams.

4. To remove the surplus at the upper end of the side-flap in the ordinary double-side-seam envelope thereby permitting me to gum a greater area of the flap and thus give added security to the envelope, and improve the appearance thereof;

5. To utilize air pressure, preferably in the form of a blast of compressed air to strip the ends of the web of paper from the gripper-roll so that the partly finished envelope may be positively positioned for further manipulation, and so overcome the disadvantage present in mechanical means now used for this purpose, since the movement of said means is of a reciprocating character, and necessarily the output of a machine is unnecessarily limited thereby.

Further objects of my invention will from time to time be set forth in the following specification in which I shall describe a machine within my invention, and what I claim as new will be set forth in the claims forming part of this specification.

Figure 2:
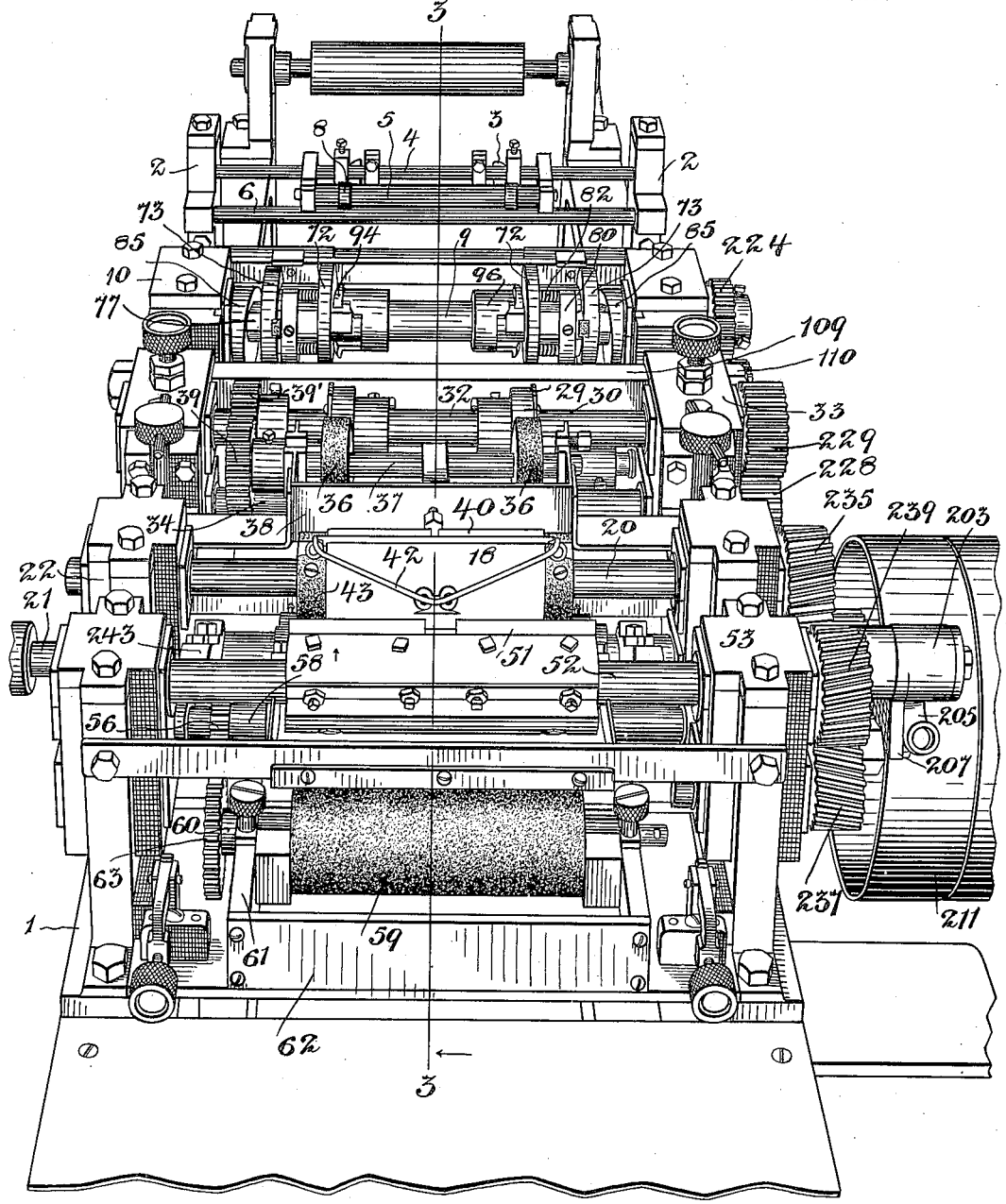
Figure 25:
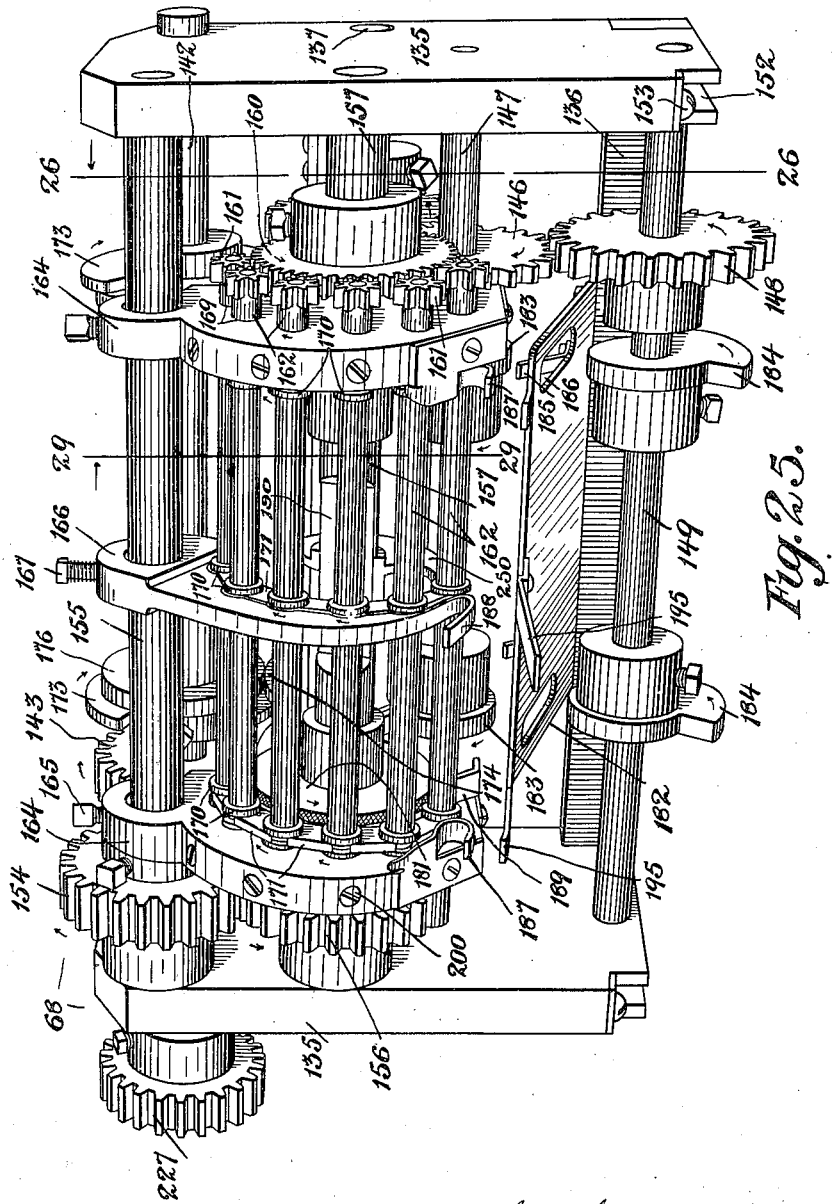
Figure 26:
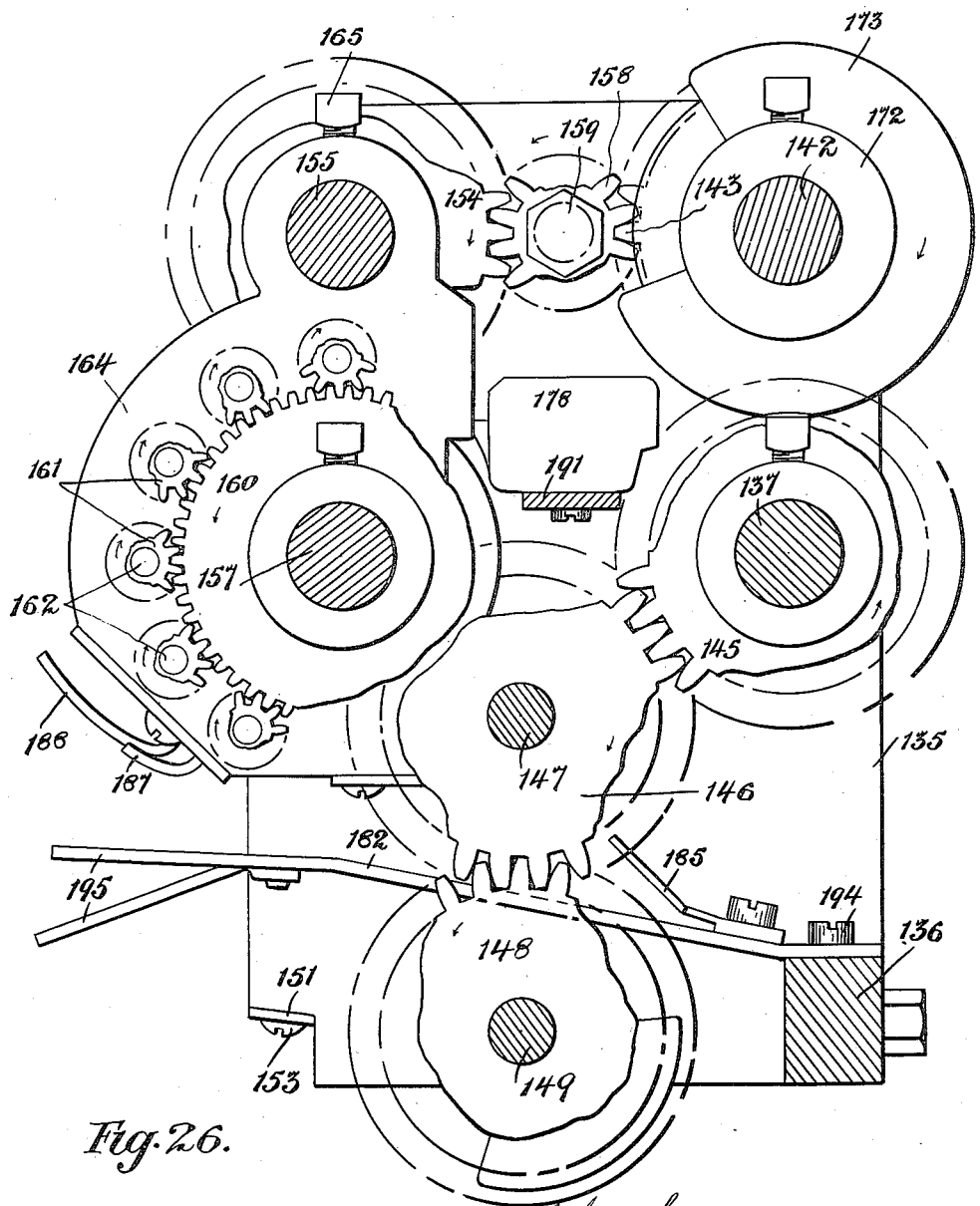
Figure 27:
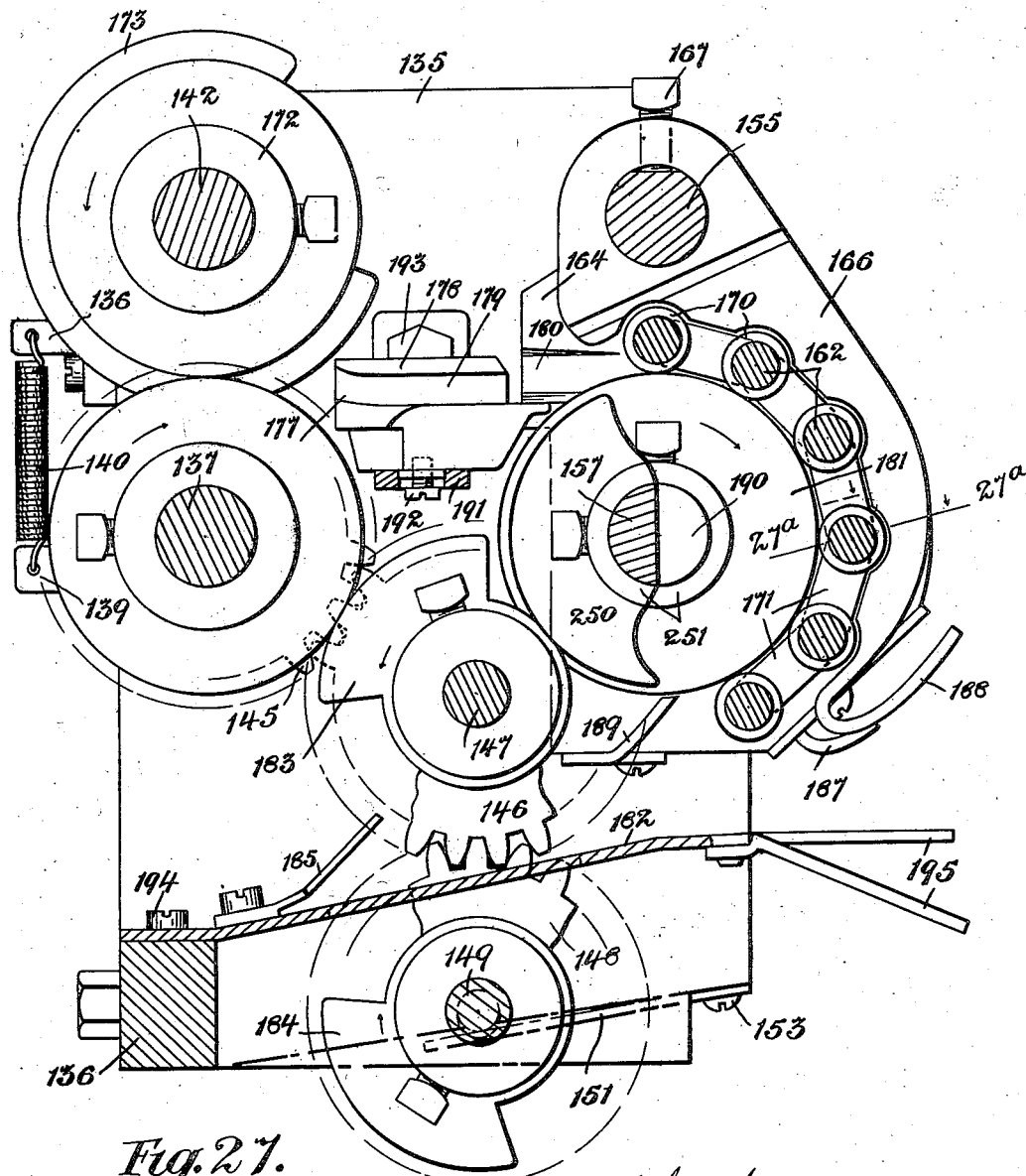
Figure 28:
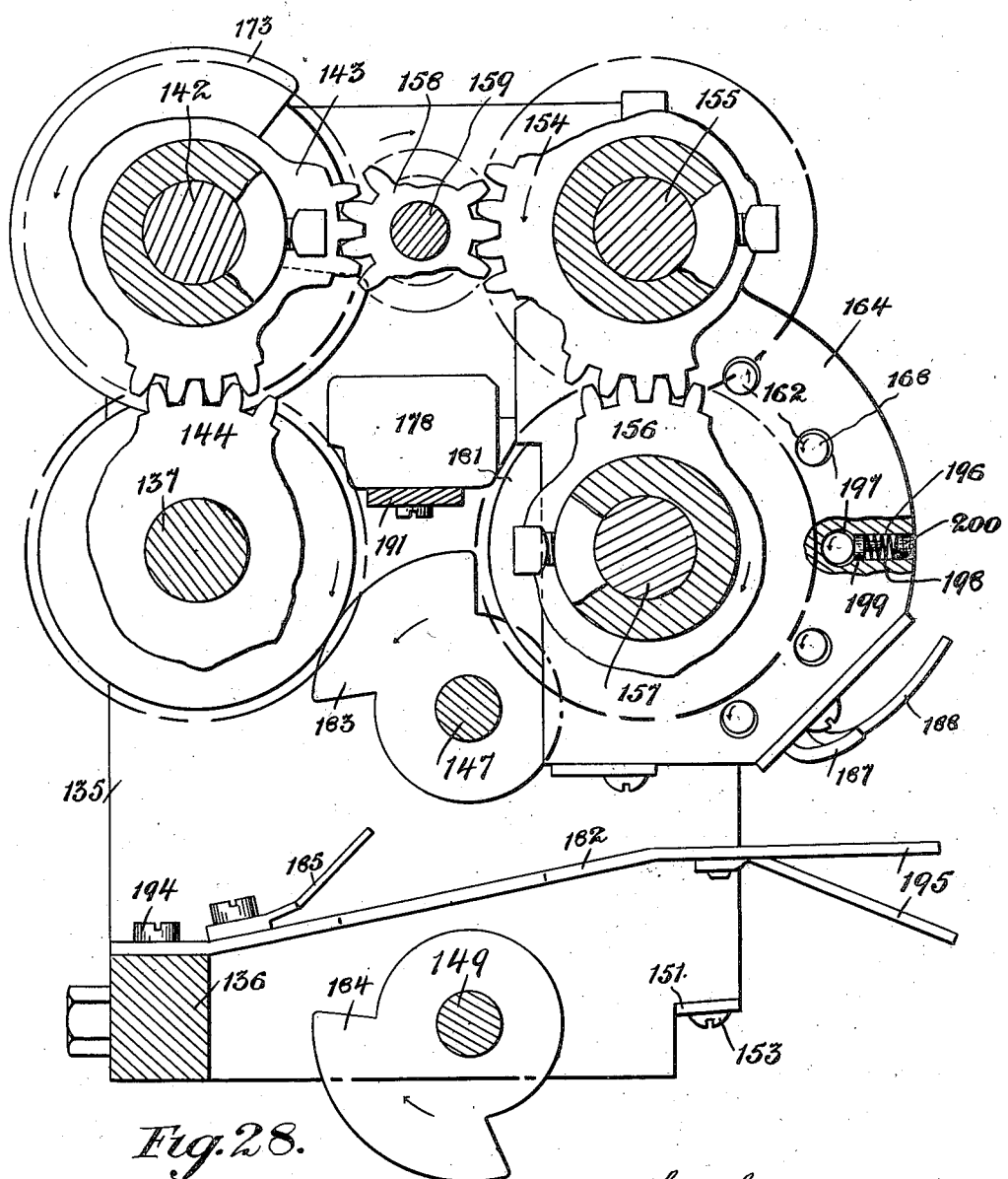
Figure 33:
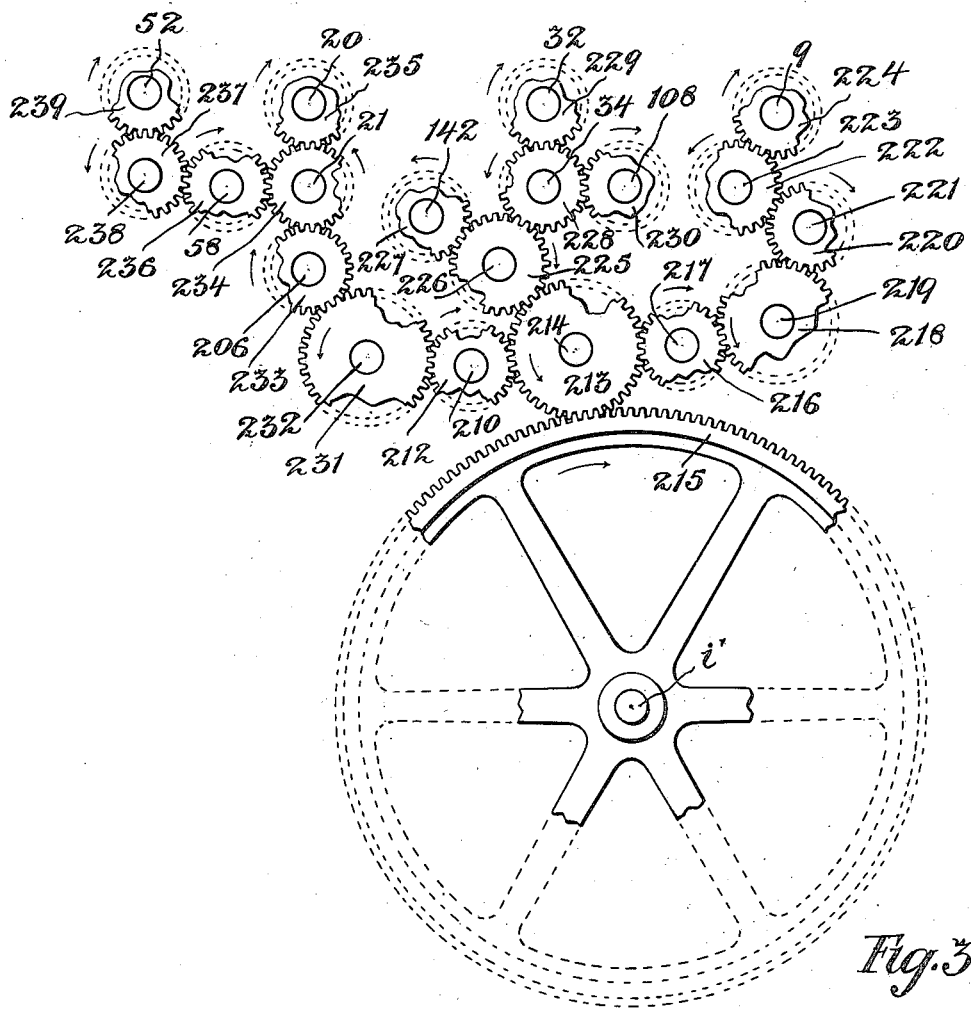

Fig. 1 is a view in perspective of the major portion of my preferred form of machine, from one side thereof. Fig. 2 is a view in perspective of the machine looking from the rear end thereof. Fig. 3 is a vertical central longitudinal section on the line 3—3, Fig. 2. Fig. 3$^a$ is a view in perspective of the preferred type of end-flap turner used to keep the side flaps in their respective positions before the web of paper is cut. Fig. 4$^a$ is a side elevation on an enlarged scale, of the end-flap turner shown in Fig. 3$^a$. Fig. 4 is a view in perspective of the preferred form of rotary die and punch used to cut notches in the side-flaps in a certain type of envelope manufactured by my machine. Fig. 5 is a plan view of Fig. 4. Fig. 6 is a vertical cross-section on the line 6—6, Fig. 5. Fig. 7 is a vertical cross-section on the line 7—7, Fig. 5. Figs. 8 and 9 are respectively an edge view, and an elevation of the inner side, of a certain cam co-acting with the rotary die and punch. Fig. 10 is a view in perspective of the rotary die and punch showing the same in operation. Fig. 11 is a vertical longitudinal section on the line 11—11, Fig. 5. Fig. 11$^a$ is a vertical longitudinal section through one of the die-hubs. Figs. 12 and 13 are views in perspective of two forms of punches used. Figs. 12$^a$ and 13$^a$ are plan views of the inner ends of the preferred form of punch shanks shown respectively in Figs. 12 and 13. Fig. 14 is a view in perspective of the rotary die and punch showing the action of one element thereof in straightening up a portion of a side flap prior to the severance thereof, and Fig. 15 is a side elevation of the flanges co-acting with the rotary punch and die showing these flanges in action in moving the side flaps against the face of the rotary die which is shown in side elevation. Fig. 16 is a plan view of the side-flap turners used in connection with the manufacture of the double-side-seam envelope. Fig. 17 is a side elevation of the parts shown in Fig. 16, omitting the web of paper. Fig. 18 is a vertical cross section on the line 18—18, Fig. 17. Fig. 19 is a view in perspective of the side-flap turners, partly in section, showing the same in operation. Fig. 19ª is a view in perspective of the preferred form of one of the levers used in the side-flap turners. Fig. 20 is a view in perspective of the preferred form of cam used to manipulate the levers shown in Fig. 19ª. Fig. 21 is a side elevation of the die-roll, and the gripper-roll thereunder, showing in section certain valve mechanism associated with said gripper-roll whereby a blast of air is released to strip the ends of the web of paper from said latter roll after the flap has been cut. Fig. 22 is partly a vertical cross section through certain parts of the machine showing the action of the air blast in stripping the ends of the web of paper from the gripper-roll. Fig. 23 is a vertical cross section on the line 23—23, Fig. 21. Figs. 24 and 25 are views in perspective, respectively, of the front and rear sides of the combined automatic envelope-inverter and flap-folder. Fig. 24ª is a detail, partly in section, of a certain part of said inverter, showing the preferred manner of yieldingly supporting a certain shaft thereof. Fig. 24ᵇ is an edge view of parts of certain folding discs forming part of the inverter which position the outer side-flaps for the folding thereof against the back of the envelope. Fig. 26 is a vertical cross section on the line 26—26, Fig. 25. Fig. 27 is a vertical cross section on the line 27—27, Fig. 24. Fig. 27ª is a horizontal cross section on the line 27ª—27ª, Fig. 27. Fig. 28 is a vertical cross section on the line 28—28, Fig. 24. Fig. 29 is a vertical cross section on the line 29—29, Fig. 25. Fig. 29ª is a horizontal cross section on the line 29ª—29ª, Fig. 29. Fig. 30 is a diagrammatic view showing in end elevation the preferred means for gumming the double-side-seam envelope, and Fig. 31 is a plan view of the parts shown in Fig. 30. Fig. 32 is a detail view of the preferred type of gumming segment. Fig. 33 is a diagrammatic view of the preferred arrangement of the main train of gearing used. Fig. 34 is a diagrammatic view of the different stages in the manufacture of one type of envelope made by my machine, from the time the web of paper enters the machine to the discharge of the finished envelope from the machine with the flap thereof folded. Fig. 35 is a plan view of the preferred form of double-side-seam envelope blank, showing the preferred manner of gumming the envelope, and Fig. 36 is a longitudinal cross section therethrough after the same has been folded and the side-flaps sealed. Fig. 37 is a plan view of a well-known form of envelope blank having side-flaps, the flaps at one side being folded inward. Fig. 38 is a rear view of portion of an envelope made from the blank shown at Fig. 35 after the same has been folded and side-flaps sealed, thus showing one style or shape for the ends of the outer side-flap. Fig. 39 is a rear view of portion of a double-side-seam envelope showing where the back is gummed, the outer flap being open. Fig. 40 is a view similar to Fig. 39 except that the outer flap has been folded and sealed against the back: these two views show a different style of finish or cut for the ends of the outer side-flap, and Fig. 41 is a plan view of portion of the web with the side-flaps folded outwardly, showing the preferred form of notches cut therein.

In the drawings, like characters of reference refer to the same parts.

In any given machine designed to do work, if the movements of the principal moving parts thereof are of a reciprocating character, the productive capacity of the machine is limited by the maximum speed of the slowest reciprocating part, and since the cost of production of any given article depends greatly upon the productive capacity of any given machine, obviously it is a desideratum to increase its productive capacity. What I have stated is a fundamental fact, and in the type of machine under consideration I have given the principal parts thereof a rotary motion each of which is the concomitant of the other: this fact enables me to automatically invert the envelope and individually fold the flap thereof prior to the delivery of the finished article from the machine; these movements are of very great importance because they enable me to dispense with manual labor to fold the flap, and are the chief reasons why I can produce a machine having a greater output than is possible by means of machines which are not "rotary" in character.

It must be understood that at all stages the envelope undergoing manufacture, as well as the completed envelope, is under the control of some part of the machine, and consequently this continuity of mechanical domination is one of the reasons whereby I am enabled to secure an increased output. The result is that neither the web, nor the partly finished envelope, nor the finished envelope, can get out of alignment.

I shall first describe my machine as adapted to manufacture the overlapped double-side-seam envelope.

1 is any suitable frame, and carried thereby is a pair of standards 2 which support the folding and ironing mechanism which may be of any convenient type, and is shown as composed of a pair of warping-plates 3 carried by a bar 4 which is supported by said standards. 5 and 6 are a pair of rolls between which the web of paper 7 is passed, and the roll 5 is provided with a pair of flanges 8 adapted to iron the side-folds so as to crease them after they have been formed by the plates 3. 9 is a shaft journalled in standards 10, and with this shaft is associated the mechanism for severing, cutting, or notching, the side-folds as the web passes through the machine. When first starting up the machine, the web 7 is drawn by hand through the warping-plates 3 and between the rolls 5 and 6, and is passed up through the machine and between the die-roll 18 and gripper-roll 19 which co-act henceforth to control the movement of said web, as hereinafter more particularly explained for the preferred manner. In so positioning the web of paper the various parts of the machine are preferably preliminarily moved by means of the hand wheel *a* which is keyed to the shaft of the gripper-roll 19. In the disclosure made, in order to hold the said side-folds in a vertical position they are passed between the flanges 11 and 12 mounted by means of their hubs 13 on the spindles 14 (see Figs. 3 and 4 and 14) which are journalled in the brackets 15 associated with the standards 10 as by means of a bar 16 carried thereby. These spindles are so associated as to yield according to the thickness of the web 7: a convenient way of mounting these said spindles so that they may function as set forth is to mount the upper spindle in slots 17 formed in the brackets 15. The die-roll 18 and gripper-roll 19 are mounted respectively on the shafts 20 and 21 which are journalled in the standards 22: these shafts are driven after any suitable manner, as hereinafter more particularly set forth.

In Fig. 34 I show the unsevered side-folds 23 after the web of paper passes through the folding and ironing device, from which is formed the side-flaps. These side-folds are shown in vertical position at 24, in which position they are held as they pass between the flanges 11 and 12. The rotary severing, cutting, or notching, device then operates to sever said side-folds and more specifically to cut notches 25 and 26 therein, for the full depth of the folds, and in this specific disclosure, of different shapes, thus forming the said side-flaps. After the said side-flaps have been formed as described, a movable side-flap turner comes into operation and the same is adapted to alternately turn said side-flaps inwardly and outwardly. At 28 I show certain of the side-flaps as being turned inwardly, and it naturally follows that the immediately-following side-flaps will be turned outwardly. The inner side of the partly-formed envelope is gummed at the edges thereof as shown by the lines *m* by means of the gumming segments 29 shown diagrammatically in Fig. 34. These gumming segments are suitably carried by discs 30 (see Figs. 3, 30 and 31) mounted by means of their hubs 31 on the shaft 32 suitably journalled in the standards 33. 34 is a shaft journalled in the standards 33, below the shaft 32, and suitably keyed to said shaft 34 are discs 35 over which the web of paper 7 passes (see Figs. 3 and 30) and with which co-act the gumming segments 29. These gumming segments have rolling contact with the gumming roll 36 mounted by means of its shaft 37 in the gumming box 38. 39 is a gear wheel carried by the shaft 37 and in mesh with the gear wheel 39' carried by the shaft 32.

When the web of paper is first passed by hand between the rolls 18 and 19, there is a clearance between these rolls so that the web 7 may be properly positioned. By means of the hand wheel *a*, or its equivalent, the rolls 18 and 19, through the medium of drive mechanism hereinafter described, are rotated in the directions indicated by arrows Figs. 3 and 22, and in due course the tucker-blade 40 associated with the die-roll 18 in the usual way, co-acts with the gripper-plate 41 mounted in the usual way in the gripper-roll 19, so that the web of paper will be coupled to said roll 19, and immediately thereafter the die 42 severs the web; this severed portion is of course waste. 43 are friction bands associated with each end of the die-roll 18, in the usual way, and these co-act with the now power-driven gripper-roll 19 as soon as the web has been severed by the die 42, to feed the web forward so that the tucker-blade 44 will co-act with the gripping mechanism 45 thus gripping the web 7 and feeding it forward during the time when the friction bands 43 and die 42, are not in operation. This tucking of the web 7 forms the crease or fold 46, at the bottom of the partly-formed envelope, and of course by the previous operation of the die 42 the cut 47 has been formed, (Fig. 34). As soon as the cut 47 has been completely made, a blast of air is forced through the ports 48, through suitable means hereinafter particularly described, so as to strip the ends 49 of the web from the gripper-roll 19 so that as the web travels forward these ends will be positioned to pass over the upper side of the table 50 so that in due course the said ends 49 will be cut off by the rotary knife 51 mounted on the shaft 52 which is journalled in the standards 53 suitably carried by the frame 1. The shape of the cut 47 is somewhat altered by the operation just described as shown at *b*. Fig. 34.

While the gripping mechanism 45 is in operation, the envelope-blank is passed between the gripper-roll 19 and the roll 54, during which time the gumming of the envelope is completed. Suitably carried by the roll 54 are a pair of gumming segments 55 (Figs. 22 and 32), and these come into operation to gum the rear side of the back of the envelope-blank before the flap has been gummed, as shown by the broken and dotted lines m' respectively in Figs. 35 and 39. Suitably carried by the roll 54 is a die 56 shaped to gum the flap, and this operation takes place very shortly after the gumming of the back of the envelope-blank, as will be seen upon referring to c and d, Fig. 34. 57 is the flap.

58 is the shaft of the roll 54, and the same has bearing in the standards 53 (see Figs. 3 and 22). 59 is a gumming-roll mounted on the shaft 60, which shaft has bearing in the ends 61 of the gum-box 62. 63 is a gear wheel carried by the shaft 60 and in mesh with the gear wheel 64 carried by the shaft 58 so as to rotate said gumming roll. 65 are a pair of friction discs mounted on a shaft 66 which is mounted in a well-known manner in spring-held bearings 67, as shown clearly in Fig. 3. The object of these discs is to keep the partly-formed envelope in position so that it may readily enter into the inverter properly aligned therewith.

When the partly-formed envelope passes between the discs 65 and gripper-roll 19, the flaps 27 are spread open, and in order to prevent the gumming of the inverter, these flaps must be folded against the rear side of the back of the envelope. My preferred means of finally positioning these flaps 27 will be hereinafter particularly described, but upon referring particularly to Fig. 34, at e and f the manner in which these flaps are progressively folded will be clearly seen.

68 is generally the inverter, and upon referring to g, Fig. 34, the path of the envelope through this inverter will be clearly understood from the time it enters the same until it leaves it and occupies the position h. As the envelope is moved from the position h to be held by the seam-presser and delivery wheels i, the flap 57 is folded automatically. j is any suitable stripping means, preferably in the form of discs journalled on the frame k, which frame is suitably supported by bars l suitably carried by the frame 1.

I shall now describe the preferred construction of rotary severing, cutting, or notching device: this device severs, cuts, or notches, the side-folds 23 as the web 7 travels, and without tearing or otherwise injuring the paper, thus forming the sideflaps the ends of which may be cut off thereby at any desired angle.

In Fig. 37 I show the blank from which is formed the ordinary double-side-seam envelope, and although I shall describe two punches co-acting with a die in the rotary device referred to, I may only use one of these punches so that I may cut off the surplus or waste 69 at the upper end of the side-flap 70 so that when the envelope is completed as shown partly in Fig. 38, it will possess a much neater appearance.

There is one rotary die near each end of the shaft 9, with each of which is associated two punches, so that the side-folds 23 on each side of the web 7 may be simultaneously acted upon, and therefore the description of one will do for both. Suitably keyed to the shaft 9 is a die-hub 71 by means of which the die 72 is held in position. The outer end of each die-hub is threaded to receive the internally threaded flange 73 which forms a stop for the punches. Formed in the die 72 are the openings 74 of the desired shape, and communicating with said openings are slots 75 formed longitudinally in the die-hub 71: these slots also project through the flange 73 as shown at 76, (Figs. 11 and 15) and mounted to operate in each of said slots is a punch-shank 77. As is common in machine construction, these punch-shanks are provided with flanges 78 which retain the said punchshanks from radial displacement during the rotation of the die 72 by engagement with the flanges 79 of the die-hub 71. Secured to, or formed part of each punch-shank 77 is a stop 80, and these stops are provided with a pair of recesses 81 on their inner sides to receive the outer ends of the coiled-springs 82, the inner ends of which are supported in the recesses or pockets 83 (see Fig 11ª) formed in the outer side of the die 72. Loosely mounted on each end of the shaft 9 by means of the opening 84 therein is a cam 85 against the face of which tracks the outer end 86 of each punchshank 77. As the shaft 9 rotates, because of the co-action between the punch-shanks 77 and the stationary cam 85, said punchshanks ride up the inclined face of said cam, and before they are carried far enough around by the die 72, they are moved beyond the side-folds 23. When the said punch shanks are carried into the position shown in Fig. 10, immediately the end 86 of each punch-shank 77 passes by the end 88 of the cam 85, the respective pair of springs 82 will shoot the punches and so cut the desired notches in the side-folds 23. Each punch 87 carries through its associated opening 74 its cutting, and as there is plenty of space behind each die 72 there will be no choking of same.

As the outer end 86 of each punch-shank 77 escapes by the end 88 of the cam 85, it passes into a recess 89 cut in said cam, and the impact of each stop 80 is received by the buffer 90 suitably secured to the flange or stop 73.

The edges of each punch-shank 77 adjacent the punch 87 is recessed and more or less bevelled as shown at 91 so that there will be no interference with the top edge of the side-folds 23.

The shape of the notch cut by the upper punch shown in Fig. 10, is shown at 25 (Figs. 10, 35, and 41), and the shape of the notch cut by the lower punch 87 shown in Fig. 10, is shown at 26 (Figs. 14, 34 and 41).

Upon comparing the shape of the notch 26 in Fig. 41 with the shape of the surplus or waste portion 69 in Fig. 37, it will be observed that it is the lower punch 87 in Fig. 10 that removes said surplus portion.

Upon referring particularly to Fig. 14 it will be observed that as the web 7 passes through the machine, it passes between the flanges 11 and the hubs 11ª of the flanges 12, and of course the pairs of flanges 11 and 12 are spaced far enough apart to permit of the free passage therebetween of the side-folds 23.

If the paper be stout enough, the side-folds 23 will not sag or buckle away from the face of the die 72, but with certain classes of paper, if particularly soft or very thin, I have found that said side-folds, after they pass the flanges 11 and 12, will buckle outwardly as shown at 23ª, Figs. 14 and 15, and the consequence is that the punches 87 cannot properly perform their function. The side-folds 23 should lie parallel with the inner face of each rotary-die 72 and preferably thereagainst. Now in order to position the buckled or sagged portion 23ª, I have provided a pair of cam-faced flanges 94 shaped as shown particularly in Figs. 5 and 15. These flanges are so shaped that the nose 95 of each one thereof will come in contact with the buckled or sagged portion 23ª and since the said cam-faces are inclined or sloped towards the inner face of the rotary-die, they will position the buckled or sagged portion as shown by dotted lines in Fig. 15 before the punches 87 are positioned to operate as shown at Fig. 10. The flanges 94 are in pairs, and preferably form part of a sleeve 96 suitably keyed or otherwise coupled to the shaft 9.

The sleeves 96 are cut away between the flanges 94 as shown at 97 so as not to interfere with the positioning movements of the punches 87.

Upon referring particularly to Figs. 4 to 11, both inclusive, it will be observed that each cam 85 is provided with a plate 98, and these plates are normally held against adjusting screws 99 threaded in the lugs 100 carried by the standards 10. Owing to the direction of rotation of the punches and dies, the frictional contact with the cam 85 of the punch-shanks 77 will hold the plates 98 in contact with the screws 99.

Obviously the shape of the cuts or notches formed in the side-folds 23 may be varied, and in order to secure this variation, the adjusting screws 99 are manipulated to change the position of the plates 98. This adjustment so far as the upper punch 87 of Fig. 10 is concerned will permit the cutting off of the upper and lower ends 101, and 102 of the outer flap 27, as shown clearly in Figs. 39 and 40.

The outer ends 86 of the punch-shanks 77 are substantially the same width so as to obviate having to make the recesses 89 in the cam 85 large enough to impair the strength thereof.

Referring particularly to Fig. 13, it is to be stated that the cutting-edge 103 forms the cut 104 (Fig. 41), and the cutting edge 105 (see Fig. 10) forms the curved cut 106 (Fig. 41).

Obviously the inner edges of the stops 80 will be shaped to allow for compactness of construction, and without interference with the die-hubs 71, as shown at 107, Figs. 7, 12 and 13.

The rotary-die-and-punch herein described as an exemplary disclosure of the cutting means employed in respect of the side-folds 23, may of course be used in other arts, and the same will form the subject-matter of a separate patent application.

I shall now describe the movable side-flap turners which are used when I manufacture the type of envelope shown in section in Fig. 37, that is, the overlapped double-side-seam envelope.

108 is a shaft having bearing in the standards 33, and driven as hereinafter more particularly described as to the preferred manner. There are two of these flap-turners, one at each side of the machine, and operating parts therefor, and the description of one group of elements will do for both: 109 is a bar having threaded ends, held in the standards 33, and retained in place by means of the nuts 110 screwing thereon (see Figs. 1 and 2). Tapped into this bar is a screw 111, or equivalent means on which is mounted a bell-crank lever 112 by means of its hub 113. 114 is a cam provided with a hub 115 whereby it is suitably mounted on the shaft 108 and coupled thereto in any suitable manner to be adjustable longitudinally thereof. The inner edge 116 of the cam 114 is given the desired configuration, and yieldingly held in contact therewith is a stud 117, (carried by the lever 112) by means of a coiled-spring 118 which is coupled to the opposite end of said lever 112 and to the bar 109, as shown very clearly in Fig. 16. The shaft 108 is operated in the direction indicated by arrows in Figs. 18, 19 and 3, and consequently the discs 119 secured to the shaft 8 through the medium of their hubs 120 are moved in the direction opposite to that of the travel of the web (Fig. 18), as are also the cams 114. The web of paper rests against the discs 119, and the object of rotating them in a direction opposite to that of the travel of the web is to smooth out any possible wrinkles that may gather at the edges of the web. The stud 117 tracks against the inner edge 116 of the cam 114 thus giving the necessary movements to the nose 121 of the bell-crank lever 112 so that the flaps 27 and 28 (Figs. 16, 19 and 34) will be turned in the desired directions. While the stud 117 is in contact with the uninterrupted parts of the edge 116, the nose 121 is above either of the flaps 27 and 28.

It must be remembered that the web 7 is travelling in one direction while the cam 114 is rotating in the opposite direction. Prior to the contact of the nose 121 with the flaps 27 and 28, this nose is given what I term clearance movements so as to be out of the path of movement of the leading end of the substantially vertically disposed side flaps 27 and 28. The flap 28 has been turned from a more or less vertical position inwardly as shown clearly in Figs. 16 and 19, and the following flap is to be turned outwardly. The parts are so timed that a short while before the end $aa$ of the flap 28 passes underneath the nose 121, the depression 122 moves opposite the stud 117, and the result is that the nose 121 is quickly moved in the direction indicated by arrow in Fig. 16 and consequently will be well out of the path of movement of the advancing end $bb$ of the flap 27. Immediately thereafter the shoulder 123 will cause the stud 117 to move the lever 112 in the opposite direction to that indicated by crossed arrows in Fig. 16 with the result that the flap 27 will be turned outwardly. So soon as the shoulder 125 comes in contact with the stud 117 the said nose 121 is moved in the direction opposite to that indicated by arrow in Fig. 16, so as to be out of the path of the advancing end of the more or less vertically disposed flap 28. So soon as the said shoulder 125 passes by said stud 117, the spring 118 moves the lever 112 into the position indicated in Figs. 16, 17, 18 and 19. This movement of the said lever causes the nose 121 to fold the flap 28 inwardly.

It will of course be understood that when the stud 117 is in contact with the level portions $cc$ and $dd$ of the edge 116, there will be no movement of the lever 112.

It must be understood that the means I have just described to turn the flaps 28 and 27 inwardly and outwardly alternately is merely exemplary, as these movements may be obtained by other mechanism.

The configuration of the inner edge 116 of the cam 114 will be such as to give the positive movements of the lever 112 to turn the flaps 27 and 28 as described, and the desired clearance movements for the nose 121.

If the side-flaps have a tendency to more or less move into the vertical after the gumming segments 29 have gummed the inner side of the front of the envelope (see short dotted lines $m$, Fig. 35), I make use of suitable means to properly position said flaps prior to the passage of the web 7 between the die-roll 18 and the gripper-roll 19. The preferred means used for this purpose comprises a pair of stationary side-flap turners located in front of the rolls 18 and 19, and the description of one will do for both. 126 is a bar secured by any suitable means to the standards 22. Each stationary side-flap turner comprises a plate 127 secured by any suitable means such as a screw 128 to the upper edge of the bar 126. 129 and 130 are a pair of deflecting plates, positioned substantially as shown in Fig. 4$^a$, and these plates are coupled to the plate 127 by an inverted U-shaped bracket 131. As the web of paper travels forward in the direction indicated by arrow in Fig. 3$^a$, should the flap 28 occupy the dotted position shown in Fig. 4$^a$, the lower-outer edge 132 of the plate 129 will cause the flap 28 as the edge $x$ of said flap comes in contact therewith to be moved into the original position, and should the flap 27 occupy the dotted position shown in Fig. 4$^a$, the same will enter the space in the bracket 131 and in due course will come in contact with the plate 130 and be turned in the direction indicated by arrow.

The parts just described of the stationary side-flap turners will be so curved or rounded at the desired locations so that when the flaps 27 and 28 come in contact therewith they will be readily and without injury turned in the desired directions.

The under side of the plate 129 is positioned so that the necessary clearance is provided to prevent the gum carried by the inner side of the front of the envelope coming in contact with said plate.

In order to prevent the transfer of gum from the inner side of the front of the envelope (see dotted lines $m$, Fig. 35), I make a further use of the clearance between the die-roll 18 and the gripper-roll 19. Since the flaps 28 are folded against the inner side of the back of the envelope, when the back of the inner side of the envelope is moved into position to have the ends 49 cut off by the knife 51, the friction bands 43 press thereagainst, and by the time the tucker-blade 44 shoves the web into the gripper-roll 19 to be held by the gripping mechanism 45, the front of the partly-formed envelope will start to pass between the rolls 18 and 19. The ends $a'$ of the die-roll 18 (to which ends the friction bands 43 are suitably secured) have a diameter less than the diameter of the roll 18, and the result is that as the gummed-portion of the front of the partly-formed envelope is being pulled around by the co-action between the tucker-blade 44 and gripping mechanism 45, the clearance provided will prevent the contacting of the gummed ends of said front side with the roll 18.

It must be kept in mind that the side-flaps 28 have been turned inwardly, and consequently through the co-action between the tucker-blade 44 and the gripping mechanism 45, the back a'' is folded against the rear side of the front of the envelope, and the consequence is that the outer sides of the flaps 28 are gummed to the inner side of the front of the envelope. Since the described gummed-portion of the front of the envelope has been covered, the discs 65 co-acting as before described with the roll 19 will not be gummed.

Since the extreme end of the flaps 57 are not gummed, the discs 65 will not be gummed from this source.

The discs 65 are adjustably mounted on their shaft 66, as shown clearly in Fig. 21.

I shall presently describe my combined automatic inverter and flap-folder, the function of which is to automatically invert the position of the envelope prior to the folding of the flap, and the same is functionally located between the gripper-roll 19 and the seam-presser and delivery wheels i, which are suitably keyed to a shaft i', mounted in the bearings i'' carried by the machine frame. The said shaft is driven by suitable means, hereinafter particularly described.

Mounted on the shaft i' and held against rotation thereon by any suitable means not necessary to illustrate since the same forms no part of my invention, from the fact that these seam-presser and delivery wheels i are well-known in the art, are spiders 11, which are located adjacent the outer sides of the said wheels. j' is an endless belt which is snugly held in contact with each of the wheels i for the greater portion of the periphery thereof, by being passed over the pulleys j'' mounted on the bars j''' journalled in the ends of the arms of the spiders 11. As is common in the art, the envelope is held at each end between the endless belt j' and the wheels i, and are stripped therefrom in due course by means of the stripping discs j. In my case, however, the flap has been first folded before the envelope enters the presser wheels i.

I have preferably combined in one mechanism means to invert the envelope, and to fold the flap, though these functions can be performed by separate mechanism having no mechanical connection, if desired. While in Fig. 3, I show my combined inverter and flap-turner as mounted with the frame thereof out of the vertical, this mounting of the same is not absolutely essential. I preferably mount the elements for inverting the envelope and folding the flap in a separate frame, though this is not essential. The said frame (see Figs. 24 and 25) may comprise end standards 135 which are coupled together at their lower ends by a tie-bar 136 suitably secured thereto. 137 is a shaft flexibly supported and the ends of which are mounted to rotate in the enlarged holes 138 formed in the standards 135. 139 are bearing plates adapted to receive the ends of the shaft 137 as shown in Fig. 24ª. These plates 139 are coupled by springs 140 to the standards 135 by any suitable means 136. The ends of the shaft 137 adjacent the plates 139 are provided with shoulders 141 so as to prevent any material longitudinal displacement of said shaft. 142 is a shaft journalled in the standards 135; this is the main drive-shaft, and suitably keyed thereto is a gear wheel 143 which meshes with the gear wheel 144 keyed to the shaft 137. Also keyed to the shaft 137 is a gear wheel 145 which is in mesh with the gear wheel 146 keyed to the shaft 147 which is likewise journalled in the standards 135. The gear wheel 146 meshes with the gear wheel 148 keyed to the shaft 149 journalled in the holes 150 formed in the standards 135. These holes are larger than the ends of the shaft 149 so as to allow for the movement of said shaft against the leaf-springs 151 mounted in the recesses 152 by means of the screws 153. 154 is a gear wheel loosely mounted on the bar 155 the ends of which are firmly mounted in the standards 135, and this gear wheel is in mesh with the gear wheel 156 keyed to the shaft 157 also journalled in said standards. 158 is an idler-pinion mounted on the stub-shaft 159 carried by one of the standards 135, and in mesh with the gear wheels 143 and 154.

160 is a gear wheel keyed to the shaft 157, and this gear wheel is constantly in mesh with a plurality of pinions 161 keyed to the outer ends of the spindles 162, which spindles are journalled in the standards 164 mounted at their upper ends on the bar 155 and held in place thereon by any suitable means such as the set screws 165.

Also carried by the bar 155 intermediate the standards 164 is a supporting member 166 which is held in place by means of the set screws 167 passed through the head thereof and bearing against the bar 155.

As stated, the spindles 162 have bearing in the standards 164, and for this purpose they are preferably reduced as shown at 168, (Fig. 29ª). This construction of the spindles provides each one with a shoulder 169 adjacent each pinion 161, and these shoulders co-act with certain flanges to prevent the longitudinal displacement of said spindles. The spindles 162 are provided with flanges 170 near each end thereof, on the inner side of the standards 164, and intermediate their length, and certain of these flanges, besides co-acting with the shoulders 169, provide means to support certain deflecting links 171. The ends of these links 171 rest between the flanges 170, and in contact with the spindles 162, and as will be seen upon referring particularly to Figs. 27 and 29, the ends of these links are concaved so as to conform to the arc of the spindles the same rest in contact with. The construction described will maintain the links 171 in co-operative relationship in respect of the spindles 162, and certain thereof also in respect of certain feeding discs, hereinafter specified, which co-act with the flanges 170 adjacent the standards 164 to move the envelopes through the inverter.

Upon referring particularly to Figs. 25, 27, and 27ª it will be observed that the links 171 associated with the supporting member 166 are located behind the same, whereas the links 171 associated with the standards 164 are preferably located adjacent the inner sides thereof.

The outside folds 27 must be turned so as to cover the gummed-portion m' of the outer side of the back of the envelope before the envelope enters the inverter, (see positions e and f, Fig. 34) and my preferred means of doing this is as follows: keyed to the shaft 142, by means of their hubs 172, are discs 173, and these discs overlap the outer sides of the discs 174 keyed by means of their hubs 175 to the shaft 137. The discs 173 are provided on their inner sides with circular flanges 176, and these flanges normally track against the discs 174. Because of the fact that the shaft 137 is held in more or less floating bearings, the discs 174 will yield to permit of the passage between the same and the flanges 176, of the sides of the envelope (see Fig. 24ᵇ). Since the discs 173 are of a greater diameter than the discs 174, they will come in contact with the flaps 27 before the envelope is gripped between the discs 174 and the flanges 176, and the same will be moved down into the position shown at Fig. 24ᵇ, in which position said flanges will remain since the discs 173 and 174 are spaced sufficiently apart laterally for that purpose. As the envelope advances, the forward ends of the flaps 27 will enter the curved mouth 177 of the folders 178 which are slotted as shown at 179 to permit of the movement of the envelope. The shape of the mouth 177 is such that the folding of the flap 27 towards the rear side of the back of the envelope will progressively take place as shown at f, Fig. 34. The inner sides of the standards 164 are slotted as shown at 180 in alignment with the slots 179 so that the envelope will be guided to pass between the discs 181 keyed to the shaft 157 (see Figs. 24, 27 and 29) and the flanges 170 which normally track against said discs. By means of the gear wheel 160 and the pinions 161 (see Fig. 26), the spindles 162 are positively driven in the same direction and at the same speed so that in due course the envelope will be deposited on the table 182 as shown at h, Fig. 34. During the described movement of the envelope, the position of the same has been completely inverted, and it now only remains to fold the flap. Keyed to the shaft 147 is a sector 183 which co-acts with a sector 184 of the same size keyed to the shaft 149. When the enlevolpe rests upon the table 182, the end thereof at the fold 46 is limited in movement by the stops 185 (suitably carried by the table 182) as shown at h, Fig. 34. The sectors 183 and 184 must grip between them the envelope to feed it to the right so as to fold back the flap, and to permit these sectors to co-act, I preferably slot the table 182 as shown at 186, and so permit the sector 184 to co-act with the sector 183. These sectors are timed and driven by the gear wheels before described, or equivalent means, so that they will move the envelope into the seam-presser and delivery wheels i, as before described. As the envelope advances under the control of the sectors 183 and 184, by reason of the lowermost of the rotating spindles 162, the flap is folded back.

187 are curved stops carried by the standards 164 and overlapping the end flanges 170 so as to be in the path of movement of the ends of the flap 57 to prevent the same from opening out too far and thus keep it well positioned for entry into the delivery wheels i. If desired, a curved stop 188 may be carried by the supporting member 166 to perform a similar function in respect of the centre portion of the flap, though the stop 188 is not essential.

189 are strippers carried by the standards 164 and located adjacent the inner sides thereof in the path of movement of the envelope as it passes between the end flanges of the lowermost spindle 162 and the discs 181, so as to prevent any possibility of the envelope being carried around by said discs.

Because of the size shown of the inverter, since the peak of the moving flap will move towards the shaft 157, and to prevent the contact thereof with this shaft, the same is cut away as shown at 190. It must be clearly understood that the inverter may be made large enough to allow for good clearance of the flap with the shaft 157 without the necessity of having to cut the same away.

The folders 178 are adjustably carried by a slotted bar 191, by means of the screws 192. The ends of the bar 191 are suitably secured to the standards 135 by means of the screws 193. The table 182 is preferably secured to the bar 136 by means of the screws 194.

At the outer end of the table 182 I show a plurality of plates 195 projecting therebeyond at different angles. These plates are not absolutely essential, though the centre plate supports the centre part of the envelope prior to the entry of the same into the wheels *i*.

Formed in each of the standards 164 are pockets 196 each opening into the bearings 197 of the spindles 162 formed in said standards. These bearings are larger than the diameter of the reduced portion 168 of the spindles so that the end flanges 170 of the said spindles may be yieldingly held in contact with their respective disc 181, by means of the coiled-spring 198 mounted in each of the said pockets. These springs through the medium of the thrust blocks 199 exert pressure against the spindles 162. 200 are threaded caps which screw into the pockets 196 to retain the said springs in place.

As the end of the envelope at the fold 46 passes around the inverter, the deflecting links 171 absolutely ensure that the same have a free and unobstructed path of movement.

While I have shown the discs 173 as interrupted, as shown particularly in Figs. 26, 27, and 28, this construction is not important.

I shall now describe my preferred means of controlling the blast of air through the ports 48 in the gripper-roll 19: the shaft 21 is provided with a passage-way 201 with which the ports 48 communicate as shown very clearly in Figs. 21 and 22. The end of this passage-way is plugged as shown at 202. The shaft 21 as constructed to perform the function now under consideration is really a valve, and the same is provided with a port 204. Mounted on the outer end of this shaft to house the port 204 is a casing 203 provided with a port 201' which communicates with the port 204. The passageway 201 communicates with the port 204 through the port 201'. 205 is a coupling which is carried by the casing 203 to communicate with the ports 201' and 204, and by means of this coupling the compressed air is conveyed to the passage-way 201 from any source of supply, not shown. 206 is a stub-shaft carried by one of the standards 22, and supported by the outer end of this shaft is a plate 207 which is secured to, or formed part of, the casing 203. The plate 207 is slotted as shown at 208, and through which passes a screw 209 carried by the outer end of the stub-shaft 206: by reason of the construction just described the casing 203 may be moved so as to shift the position of the mouth of the port 204 and so regulate the timing of the escape of air through the ports 48.

The shaft 21 of course rotates, and the preferred means for rotating the same, as well as certain of the other shafts already mentioned, is as follows (Fig. 33): 210 is the main drive-shaft suitably journalled in the frame 1, and the same is provided with the drive-pulley 211. Keyed to the shaft 210 is a gear wheel 212, and in mesh with this gear wheel is a gear wheel 213 loosely mounted on the stub-shaft 214 carried by the machine frame. The gear wheel 213 drives the gear wheel 215 which is keyed to the shaft *i'*. 216 is a gear wheel loosely mounted on the stub-shaft 217 carried by the machine frame, and in mesh with the gear wheel 213. In mesh with the gear wheel 216 is a gear wheel 218 loosely mounted on the stub-shaft 219 suitably journaled in the frame 1. 220 is a gear wheel in mesh with the gear wheel 218, and loosely mounted on the stub-shaft 221 which is suitably carried by one of the standards 10, and in mesh with this wheel is a gear wheel 222 loosely mounted on the stub-shaft 223 also suitably carried by the same one of standards 10. 224 is a gear wheel keyed to the shaft 9 and in mesh with the wheel 222. The train of gearing just described transmits power to the rotary-punch-and-die mounted on the shaft 9.

225 is a gear wheel in mesh with the gear wheel 213, and loosely mounted on the stub-shaft 226 suitably carried by the machine frame. 227 is a gear wheel keyed to the shaft 142, and in mesh with the gear wheel 225, and through which the various shafts of the automatic inverter and flap-turner receive power. 228 is a gear wheel in mesh with the gear 225, and keyed to the shaft 34 which carries the discs 35 which co-act with the gumming segments 29. In mesh with the wheel 228 is a gear wheel 229 which is keyed to the shaft 32, which shaft positively drives the gumming segments 29. 230 is a gear wheel in mesh with the gear wheel 228, and keyed to the shaft 108 for the purpose of positively driving the discs 119.

231 is a gear wheel loosely mounted on the stub-shaft 232, suitably carried by the machine frame, and in mesh with the gear wheel 212. In mesh with the gear wheel 231 is a gear wheel 233 loosely mounted on the stub-shaft 206 (see Fig. 21). This gear wheel is in mesh with the double-faced gear wheel 234 keyed to the shaft 21, and in mesh with the gear wheel 234, is a gear wheel 235 keyed to the shaft 20. By means of the gear just described the die-roll 18 and gripper-roll 19 are driven. In mesh with the gear wheel 234 is a gear wheel 236 keyed to the shaft 58, and by means of which the gumming roll 54 (Fig. 22), is driven. In mesh with the gear 236 is a gear wheel 237 loosely mounted on the stub-shaft 238 carried by one of the standards 53, and in mesh with the wheel 237 is the gear wheel 239 which is keyed to the shaft 52 for the purpose of driving the rotary knife 57. The table 50 is carried by any suitable bar 240 the ends of which are mounted in the standards 22, and carrying nuts 241 which hold it in place. Secured by any suitable means such as bolts 242 to the bar 240, (Figs. 21 and 22) are arms 243 the forward portions of which surround the shaft 21 as shown at 244. These forward portions each support a sleeve 245 which carries a cam 246 (see Figs. 21 and 22). Co-acting with these cams are the levers 247 carried by the bars 248 in which the gripping blades are mounted. The bars 248 are mounted in the gripper-roll 19, as is well-known and are spring-provided so that as the levers 247 escape each its associated cam 246, the gripping-blades will be actuated to co-operate with their respective tucker-blades for the reason well-known in the art.

If the paper from which the envelopes are made has a tendency to buckle intermediate the standards 164, behind the supporting member 166, I may, if desired, key to the shaft 157, when the envelope is passing through the inverter, a sector 250 by means of its hub 251. This sector, if used, will be so timed in its movement that it will move around the shaft 157 and be in close proximity, or actually touch, the curved envelope, but not the flap thereof, and of course its movement will be timed to synchronize with the movement of the envelope.

My combined automatic envelope inverter and flap-folder is capable of use with certain well-known envelope machines, and it will form the subject-matter of a separate patent application.

Forming the subject-matter of a separate patent application will also be the means for stripping the partly-finished envelope from the gripper-roll 19, by means of compressed air.

It will of course be understood that in manufacturing the ordinary type of side-seam envelope illustrated in Fig. 37, I will omit the rotary, cutting, severing, or notching device, the movable and fixed flap-turners, and the gumming segments 55. The gumming segments 29 in this case will be used to gum the outer side of the side-seams 23 which will of course be folded inwardly.

I may manufacture the type of envelope shown in Fig. 37 and remove the waste or surplus parts 69 therefrom, and in such a case I will use only one of the punches with each die, and of course will omit the gumming segments 55, as well as the movable and stationary flap-turners.

In manufacturing the various styles of envelopes possible by means of my machine, it will of course be understood that in all cases the automatic inverter will be used as well as suitable means to fold the flap of each envelope before it enters the means for pressing the side-seams.

By one skilled in the art, it will be understood that the various parts of my machine necessarily adjustable for that purpose may be adjusted, or in some cases replaced by interchangeable parts, when I desire to manufacture an envelope substantially the same as that shown in Fig. 37 except that the flaps at one side are wider than those at the other, for the purposes of postal inspection.

It will be observed that in this disclosure of my combined automatic inverter and flap-folder, I have shown the same as performing three functions, though these functions may be performed by mechanism not mechanically connected. The first function is that of progressively turning the outside flap 27 against the gummed-portion of the outside of the back of the envelope and this function is progressively performed by the co-operating discs 173 and 174; flanges 176, and the folders 178. The next function, that of inverting the envelope, is performed by the spindles 162 and co-operating discs 181, and the third function is performed by the co-operating sectors 183 and 184 in combination with a suitable support such as the table 182 and a stop against which the flap is held when in the position shown at $h$, Fig. 34, when dominated by said sectors.

Obviously the function of what I term the inverter is to turn the envelope end for end so that the envelope will be certain to enter the seam-presser and delivery-wheels $i$ flap-end foremost, and with the flap turned or folded back.

While I have described what I consider to be the best embodiment within my invention, it must be understood that the principle thereof may be embodied in various other forms, and I desire not to be limited beyond the requirements of the prior art and the terms of my claims.

What I claim is:

1. In an envelope machine, in combination means to fold over the sides of the web of paper to form folds; means adapted to support said folds in a more or less vertical position; rotary means adapted to sever said folds to form side-flaps as the web travels; means adapted to alternately turn said flaps inwardly and outwardly; means adapted to gum the upper side of said web adjacent the out-turned flaps; a pair of rotary members adapted to pass said web of paper therebetween and to sever the web so as to form the flap and also to form the necessary transverse creases; a rotary knife adapted to cut off the ends of said severed web when fed into position by said rotary members; means to gum the rear side of the back of the envelope-blank as the same is carried around by one of said rotary members and the envelope-blank folded; means to gum the flap thereafter; means adapted to turn the outside flaps against the gummed sides of the back of the envelope, and rotary means adapted to invert the envelope and to fold the flap.

2. In an envelope machine, in combination means to fold over the sides of the web of paper to form folds; means adapted to support said folds in a more or less vertical position; rotary means adapted to sever said folds to form side-flaps as the web travels; means adapted to alternately turn said flaps inwardly and outwardly; means adapted to gum the upper side of said web adjacent the out-turned flaps; a pair of rotary members adapted to pass said web of paper therebetween and to sever the web so as to form the flap and also to form the necessary transverse creases; a rotary knife adapted to cut off the ends of said severed web when fed into position by said rotary members; means to gum the rear side of the back of the envelope-blank as the same is carried around by one of said rotary members and the envelope-blank folded; means to gum the flap thereafter; means adapted to turn the outside flaps against the gummed sides of the back of the envelope; rotary means adapted to invert the envelope and to fold the flap, and means adapted to receive each individual envelope after the flap has been folded so as to press the side-seams thereof.

3. In an envelope machine, in combination means to fold over the sides of the web of paper to form folds; means adapted to support said folds in a more or less vertical position; rotary means adapted to sever said folds to form side-flaps as the web travels; means adapted to alternately turn said side-flaps inwardly and outwardly; means adapted to gum the upper side of said web adjacent the out-turned flaps; a rotary die-and-tucker-roll, and a rotary port-provided roll positioned thereunder and adapted to co-act therewith to grip the web of paper passing between said rolls, at certain times; the die-and-tucker roll co-acting with said gripper-roll to sever the web to form the flap; the said ports in said gripper-roll communicating with the source of air supply, and means intermediate said source of air supply and said gripper-roll to control the supply of air to said ports and timed to strip the ends of the severed web from said gripper-roll; a rotary knife adapted to cut off the ends of said severed web when fed into position by said rotary members; means to gum the rear side of the back of the envelope-blank as the same is carried around by one of said rotary members and the envelope-blank folded; means to gum the flap thereafter; means adapted to turn the outside flaps against the gummed sides of the back of the envelope, and rotary means adapted to invert the envelope and to fold the flap.

4. In an envelope machine, in combination means to fold over the sides of the web of paper to form folds; means adapted to support said folds in a more or less vertical position; rotary means adapted to sever said folds to form side-flaps as the web travels; means adapted to alternately turn said side-flaps inwardly and outwardly; means adapted to gum the upper side of said web adjacent the out-turned flaps; a rotary die-and-tucker roll, and a rotary port-provided roll positioned thereunder and adapted to co-act therewith to grip the web of paper passing between said rolls, at certain times; the die-and-tucker roll co-acting with said gripper-roll to sever the web to form the flap; the said ports in said gripper-roll communicating with a source of air supply, and means intermediate said source of air supply and said gripper-roll to control the supply of air to said ports and timed to strip the ends of the severed web from said gripper-roll; a rotary knife adapted to cut off the ends of said severed web when fed into position by said rotary members; means to gum the rear side of the back of the envelope-blank as the same is carried around by one of said rotary members and the envelope-blank folded; means to gum the flap thereafter; means adapted to turn the outside flaps against the gummed sides of the back of the envelope; rotary means adapted to invert the envelope and to fold the flap, and means to receive each individual envelope after the flap has been turned so as to press the side-seams thereof.

5. In an envelope machine, in combination means to fold over the sides of the web of paper to form folds; means adapted to support said folds in a more or less vertical position; means to feed the web of paper through the machine, and rotary means adapted to cut or sever said folds at each side of said web as said web travels.

6. In an envelope machine, in combination means to fold over the sides of the web of paper to form folds; means adapted to support said folds in a more or less vertical position; means to feed the web of paper through the machine, and rotary means adapted to alternately cut spaced notches of different shapes in said folds at each side of said web as said web travels.

7. In an envelope machine, in combination means to fold over the sides of the web of paper to form folds; means adapted to support said folds in a more or less vertical position; means to feed the web of paper through the machine; rotary means adapted to alternately cut spaced notches of different shapes in said folds at each side of said web as said web travels, and means co-acting with said rotary severing means and adapted to positively position said folds when necessary prior to the cutting of said notches therein.

8. In an envelope machine, in combination means to fold over the sides of the web of paper to form folds; means adapted to support said folds in a more or less vertical position; means to feed the web of paper through the machine; rotary means adapted to alternately cut spaced notches of different shapes in said folds at each side of said web as said web travels, and means adapted to co-act with said rotary means whereby the shape of the notches cut thereby may be varied.

9. In an envelope machine, in combination means to fold over the sides of the web of paper to form folds; means adapted to support said folds in a more or less vertical position; means to feed the web of paper through the machine; rotary means adapted to sever or cut said folds at each side of the web as the same travels forward, so as to form side-flaps, and means adapted to alternately turn said flaps inwardly and outwardly.

10. In an envelope machine, in combination means to fold over the sides of the web of paper to form folds; means adapted to support said folds in a more or less vertical position; means to feed the web of paper through the machine; rotary means adapted to alternately cut spaced notches of different shapes in said folds at each side of said web as said web travels; a rotatable shaft; a pair of discs carried by said shaft over which the sides of said web pass, said discs being operated through the medium of said shaft in a direction preferably opposite to that of the travel of said web; a pair of cams mounted on said shaft, one adjacent each of the said discs, and spring-controlled means pivotally supported above said shaft, at each side of the machine and adapted to track against each its associated cam so that said side-flaps will be alternately folded inwardly and outwardly.

11. In an envelope machine, in combination rotary means adapted to feed the web of paper through the machine, which web is provided at each side with flaps spaced apart, a rotatable shaft; a pair of discs carried by said shaft over which the sides of said web pass, said discs being operated through the medium of said shaft in a direction opposite to that of the travel of said web; a pair of cams mounted on said shaft, one adjacent each of the said discs, and spring-controlled means pivotally supported above said shaft, at each side of the machine and each adapted to track against its associated cam so that said side-flaps will be alternately folded inwardly and outwardly.

12. In an envelope machine, in combination a die-and-tucker roll provided with a rotatable shaft mounted in suitable bearings; a port-provided gripper-roll provided with a rotatable shaft mounted in suitable bearings; and located underneath said die-and-tucker roll, which rolls co-act to sever a web of paper and feed it through the machine, and valve mechanism controlling a supply of air under pressure through said ports so as to strip the ends of said severed web from said gripper-roll, for the purpose specified.

13. In an envelope machine, in combination a pair of rolls located to co-act to sever a web of paper passing therebetween, one of said rolls being provided with air ports, a conduit conveying compressed air to the interior of said port-provided roll; valve mechanism associated with said conduit and exteriorly of said port-provided roll, and means actuating said valve mechanism to control the passage of air through said ports to strip the ends of said severed web from the roll they are in contact with.

14. In an envelope machine, in combination a die-and-tucker roll provided with a rotatable shaft mounted in suitable bearings; a gripper-roll provided with a rotatable shaft mounted in suitable bearings; and located underneath said die-and-tucker roll, the ends of said die-and-tucker roll for a certain distance circumferentially having clearance with the ends of said gripper-roll, the said rolls adapted to feed the paper through the machine and sever the web to form the flap, and a pair of stationary side-flap turners positioned in front of said rolls and one at each side of the machine, each comprising an inverted U-shaped bracket adapted to be carried by suitable supports, the inner side of each of said brackets supporting non-aligned deflecting plates adapted to cause the side-flaps at each side of said web to be properly positioned before the web passes between said rolls.

15. In an envelope machine, in combination means to fold over the sides of the web of paper to form folds; means adapted to support said folds in a more or less vertical position; rotary means adapted to cut notches in said folds at each side of the web as the web travels; means adapted to gum the upper side of a portion of said folds at each side of the web; a pair of rotary members adapted to pass said web of paper therebetween and to sever the same to form the flap and also to form the necessary transverse creases; a rotary knife adapted to cut off the ends of said severed web when fed into position by said rotary members; means to gum the flap, and rotary means adapted to invert the envelope and to fold the flap.

16. In an envelope machine, in combination means to fold over the sides of the web of paper to form folds; means adapted to support said folds in a more or less vertical position; rotary means adapted to cut notches in said folds at each side of the web as the web travels; means adapted to gum the upper side of a portion of said folds at each side of the web; a pair of rotary members adapted to pass said web of paper therebetween and to sever the same to form the flap and also to form the necessary transverse creases; a rotary knife adapted to cut off the ends of said severed web when fed into position by said rotary members; means to gum the flap; rotary means adapted to invert the envelope and to fold the flap, and means to receive each individual envelope after the flap has been turned so as to press the side-seams thereof.

17. In an envelope machine, in combination a first shaft rotatably mounted in suitable bearings; a pair of spaced flange-provided discs mounted on said shaft; a second shaft rotatably mounted in suitable bearings; a pair of discs carried by said shaft and rotated thereby, and located adjacent said first-mentioned discs and to track against the flanges thereof, the diameter of said first-mentioned discs being greater than the diameter of the second-mentioned discs so that as a partly-formed envelope is fed forward through the co-action between the said second-mentioned discs and said flanges, the outside side-flap will be properly positioned; a pair of stationary folders suitably supported each in alignment with said flaps and adapted to progressively fold said flaps against the back of the envelope as the same travels forward, and means adapted to invert the envelope and fold the flap after said outside side-flap has been properly positioned.

18. In an envelope machine, in combination a plurality of groups of rotary means adapted to perform various fuctions in sequence to form a completed envelope from a web of paper as the same passes through the machine, without folding the flap, and means revolving around a fixed axis adapted to tangentially receive at its upper side said travelling envelope end foremost with back facing downward, and through its rotation carry said envelope through the circular path around said axis during which the envelope is progressively simultaneously inverted and turned.

19. In an envelope machine, in combination a plurality of groups of rotary means adapted to perform various functions in sequence to form a completed envelope from a web of paper as the same passes through the machine, without folding the flap; means revolving around a fixed axis adapted to tangentially receive at its upper side said travelling envelope end foremost with back facing downward, and through its rotation carry said envelope through the circular path around said axis during which the envelope is progressively simultaneously inverted and turned, and rotary means adapted to grip said envelope after it passes from said revolving means to feed said envelope forward underneath said revolving means so as to bring the flap in contact with portion of said revolving means in order to fold the flap.

ARTHUR CHEETHAM.